United States Patent
Lee et al.

(10) Patent No.: US 11,901,507 B2
(45) Date of Patent: Feb. 13, 2024

(54) SOLID ELECTROLYTE AND METHOD FOR MANUFACTURING SAME

(71) Applicants: LG CHEM, LTD., Seoul (KR); SEOUL NATIONAL UNIVERSITY R&DB FOUNDATION, Seoul (KR)

(72) Inventors: Jehoon Lee, Daejeon (KR); Jong-Chan Lee, Seoul (KR); Jonghyun Chae, Daejeon (KR); Lucia Kim, Daejeon (KR); Dong Hyeop Han, Daejeon (KR); Na Kyung Kim, Seoul (KR); Daun Jeong, Seoul (KR); Ji-Hoon Baik, Seoul (KR); Wansoo Chang, Daejeon (KR)

(73) Assignees: LG ENERGY SOLUTION, LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 565 days.

(21) Appl. No.: 17/251,871

(22) PCT Filed: Sep. 27, 2019

(86) PCT No.: PCT/KR2019/012594
§ 371 (c)(1),
(2) Date: Dec. 14, 2020

(87) PCT Pub. No.: WO2020/067769
PCT Pub. Date: Apr. 2, 2020

(65) Prior Publication Data
US 2021/0265661 A1 Aug. 26, 2021

(30) Foreign Application Priority Data
Sep. 28, 2018 (KR) .................. 10-2018-0115701

(51) Int. Cl.
*H01M 10/00* (2006.01)
*H01M 10/0565* (2010.01)
(Continued)

(52) U.S. Cl.
CPC ....... *H01M 10/0565* (2013.01); *C01B 35/146* (2013.01); *C08L 83/04* (2013.01);
(Continued)

(58) Field of Classification Search
CPC .......... H01M 10/052; H01M 10/0525; H01M 10/056; H01M 2220/20; H01M 2300/065; Y02E 60/10
See application file for complete search history.

(56) References Cited

U.S. PATENT DOCUMENTS

2005/0026014 A1 2/2005 Fogaing et al.
2015/0249267 A1 9/2015 Yoon et al.
(Continued)

FOREIGN PATENT DOCUMENTS

CN 104685695 A 6/2015
CN 108028385 A 5/2018
(Continued)

OTHER PUBLICATIONS

Fan et. al., A Composite Solid Electrolyte Material and Preparation Method and Application Thereof, Jul. 2018, See the Abstract. (Year: 2018).*
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

The present invention relates to a polymer electrolyte and a method for manufacturing same. More specifically, a poly-
(Continued)

mer electrolyte with improved ion conductivity can be produced by adding boron nitride to a solid electrolyte comprising polysiloxane.

18 Claims, 12 Drawing Sheets

(51) Int. Cl.
  *C01B 35/14* (2006.01)
  *C08L 83/04* (2006.01)
  *H01M 10/0525* (2010.01)
  *H01M 10/058* (2010.01)

(52) U.S. Cl.
  CPC ..... *H01M 10/058* (2013.01); *H01M 10/0525* (2013.01); *H01M 2300/0082* (2013.01)

(56) References Cited

U.S. PATENT DOCUMENTS

| | | | |
|---|---|---|---|
| 2016/0351877 A1 | 12/2016 | Kusachi et al. | |
| 2017/0133711 A1 | 5/2017 | Gaben | |
| 2017/0162862 A1* | 6/2017 | Thielen | H01M 4/136 |
| 2017/0194663 A1 | 7/2017 | Zhamu et al. | |
| 2018/0261844 A1 | 9/2018 | Kim et al. | |

FOREIGN PATENT DOCUMENTS

| | | | | |
|---|---|---|---|---|
| CN | 108281704 A | * | 7/2018 | ........ H01M 10/0565 |
| CN | 108475808 A | | 8/2018 | |
| JP | 2008153054 A | * | 7/2008 | |
| JP | 2014-2938 A | | 1/2014 | |
| JP | WO2015/118988 A1 | | 8/2015 | |
| JP | 5853639 B2 | | 2/2016 | |
| JP | 2017-529645 A | | 10/2017 | |
| KR | 10-1402974 B1 | | 6/2014 | |
| KR | 10-1813363 B1 | | 12/2017 | |
| KR | 10-2018-0015843 A | | 2/2018 | |
| KR | 10-2018-0076709 A | | 7/2018 | |
| KR | 10-2018-0086026 A | | 7/2018 | |
| WO | WO-2014147648 A1 | * | 9/2014 | ............. C25B 13/08 |
| WO | WO 2016/007612 A1 | | 1/2016 | |

OTHER PUBLICATIONS

Basak et. al., High-Ionic Conductivity Electrolyte Compositions Comprising Semi-Interpenetrating Polymer Networks and Their Composites, Sep. 2014, See the Abstract. (Year: 2014).*

Adachi et. al.,Unsaturated-carboxylic Acid Type Polymer Powder Used as Gelatinizer for Electrolyte Solution of Alkaline Cell, Contains Olefin-type Unsaturated Carboxylic Acid or Its Salt as Main Structural Monomer, And Residual Monomer, Jul. 2008, See the Abstract. (Year: 2008).*

International Search Report (PCT/ISA/210) issued in PCT/KR2019/012594 dated Jan. 7, 2020.

Oh et al., "Enhanced Durability of Polymer Electrolyte Membrane Fuel Cells by Functionalized 2D Boron Nitride Nanoflakes", ACS Appl. Mater. Interfaces 2014, vol. 6, pp. 7751-7758.

Shim et al., "2D boron nitride nanoflakes as a multifunctional additive in gel polymer electrolyte for safe, long cycle life and high rate lithium metal batteries", Energy Environ. Sci., 2017, vol. 10, pp. 1911-1916.

Shim et al., "All-solid-state lithium metal battery with solid polymer electrolytes based on polysiloxane crosslinked by modified natural gallic acid". Polymer 2017, vol. 122, pp. 222-231.

Shim, "Synthesis and Characterization of Ion-Conducting Polymers and Multifunctional Fillers for Lithium Rechargeable Battery Applications", SNU Open Repository and Archive, Aug. 2017, Total 306 pages.

Extended European Search Report for European Application No. 19867689.2, dated Jun. 16, 2021.

* cited by examiner

[Figure 1]
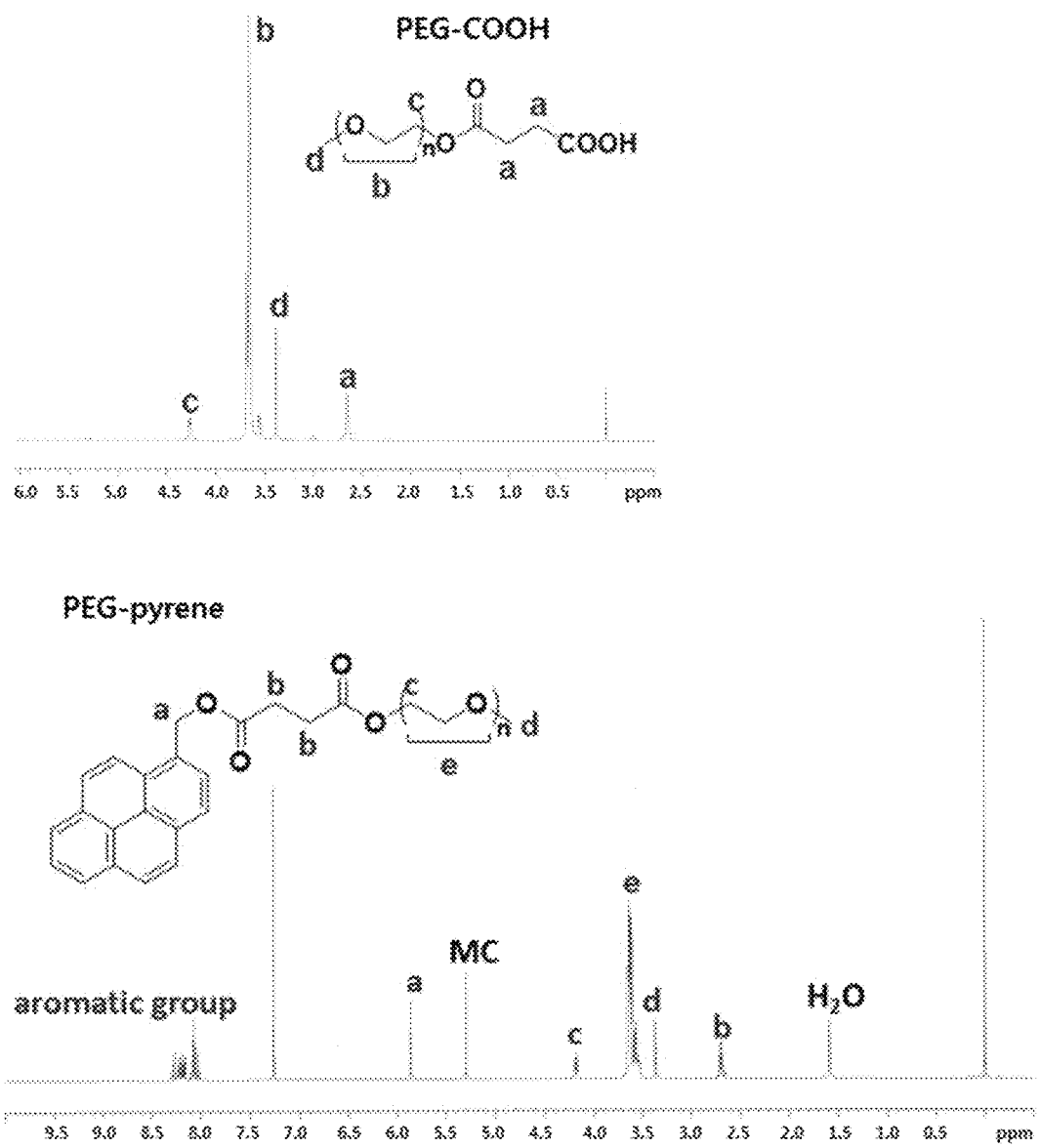

[Figure 2]
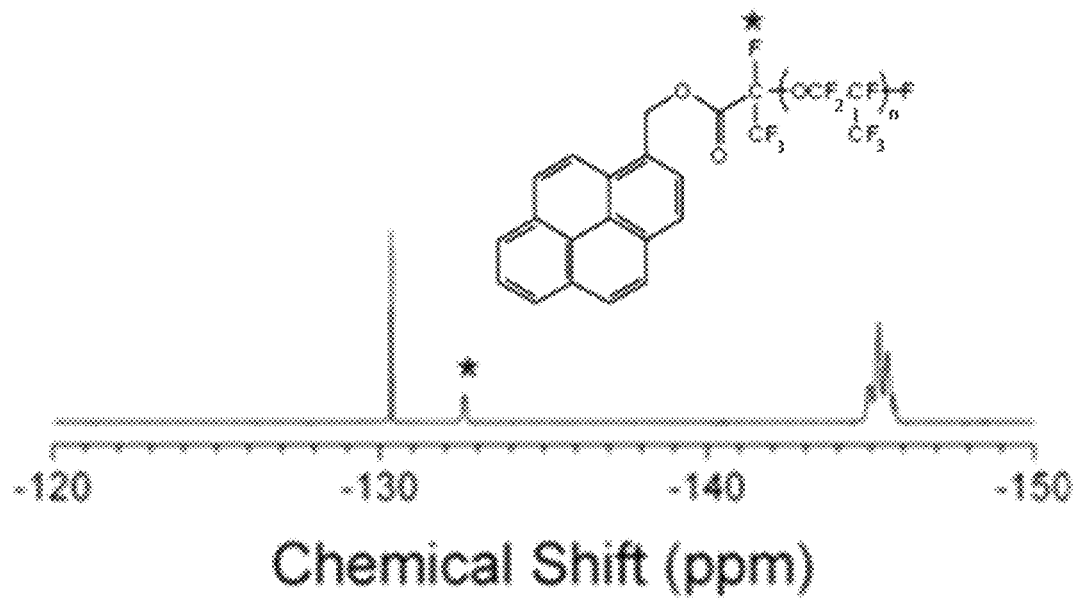
[Figure 3]
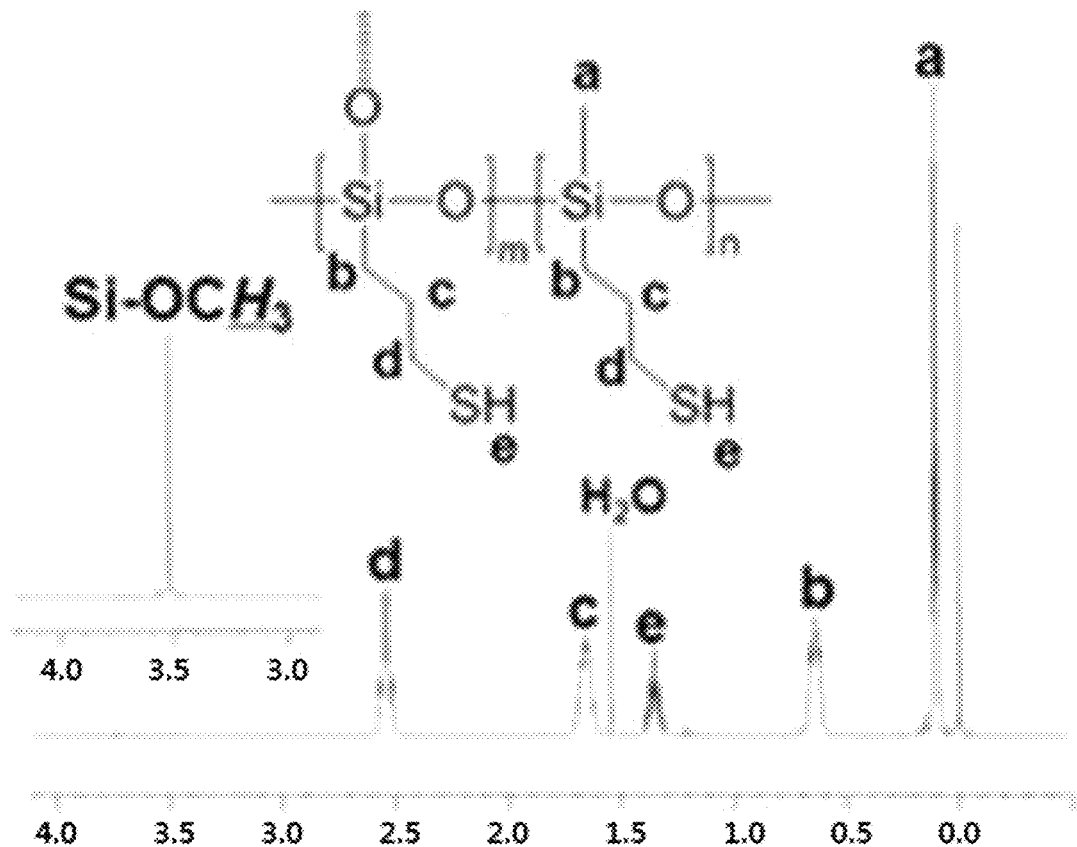

[Figure 4]
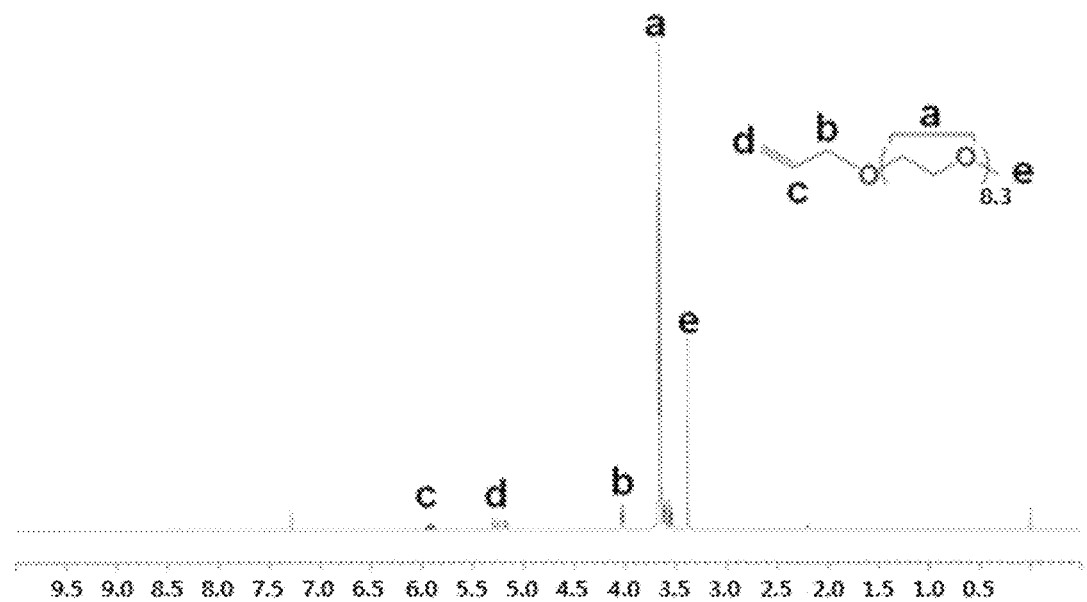
[Figure 5]
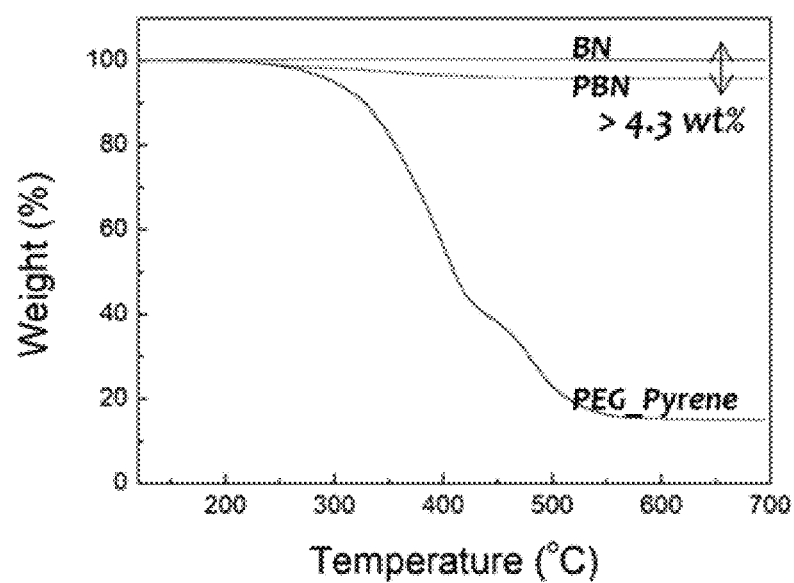

[Figure 6a]
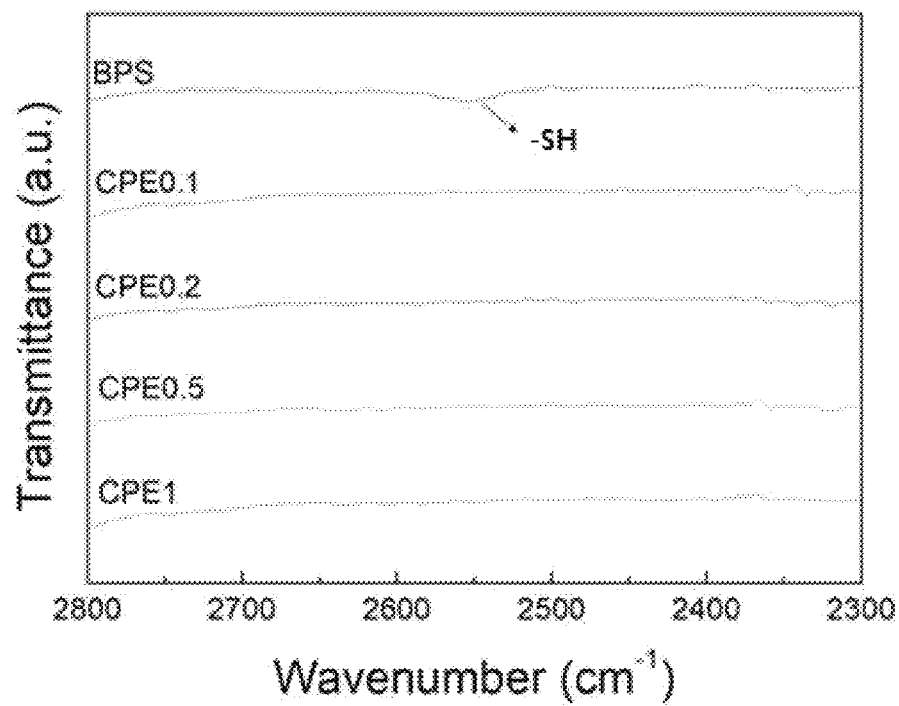
[Figure 6b]
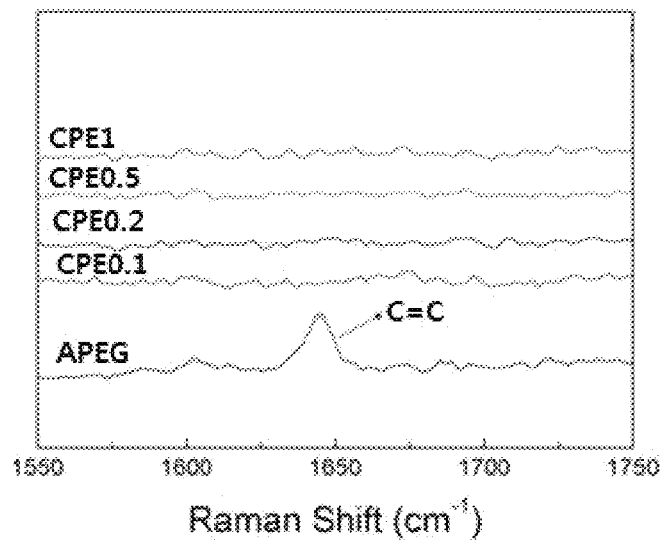

[Figure 6c]
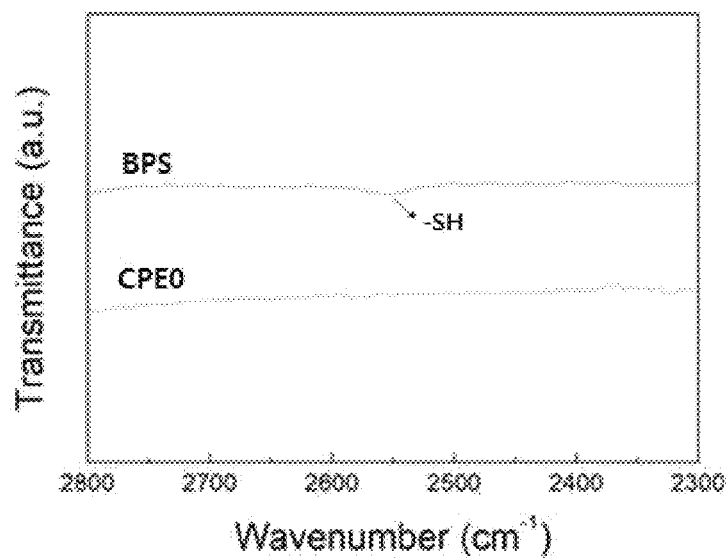
[Figure 7a]
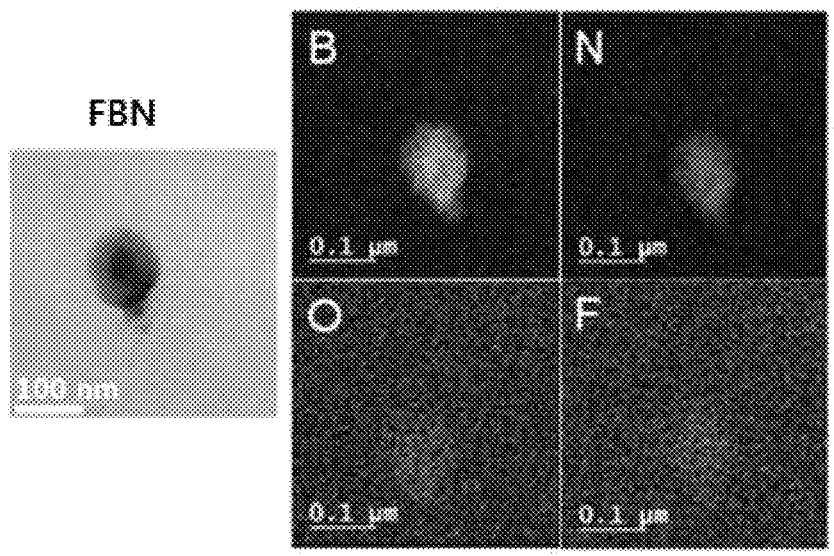

[Figure 7b]
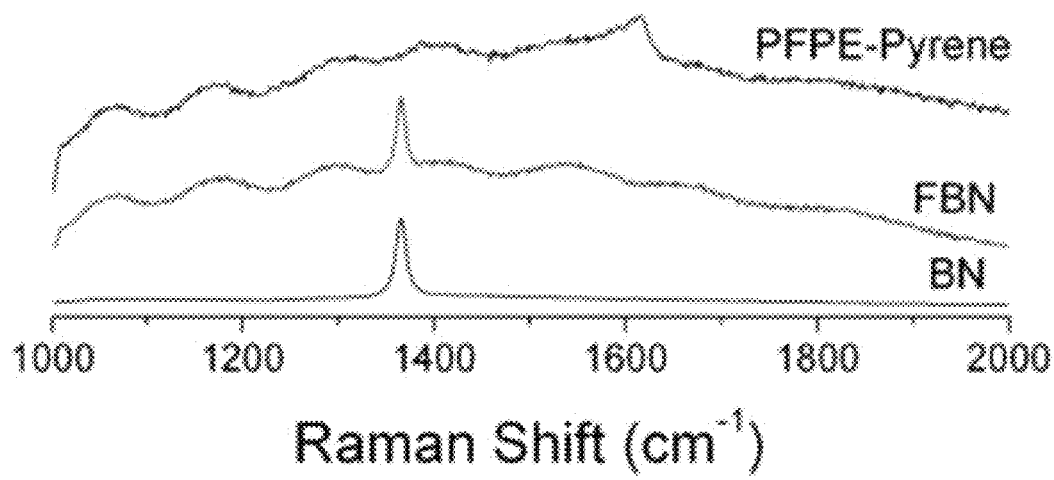
[Figure 7c]
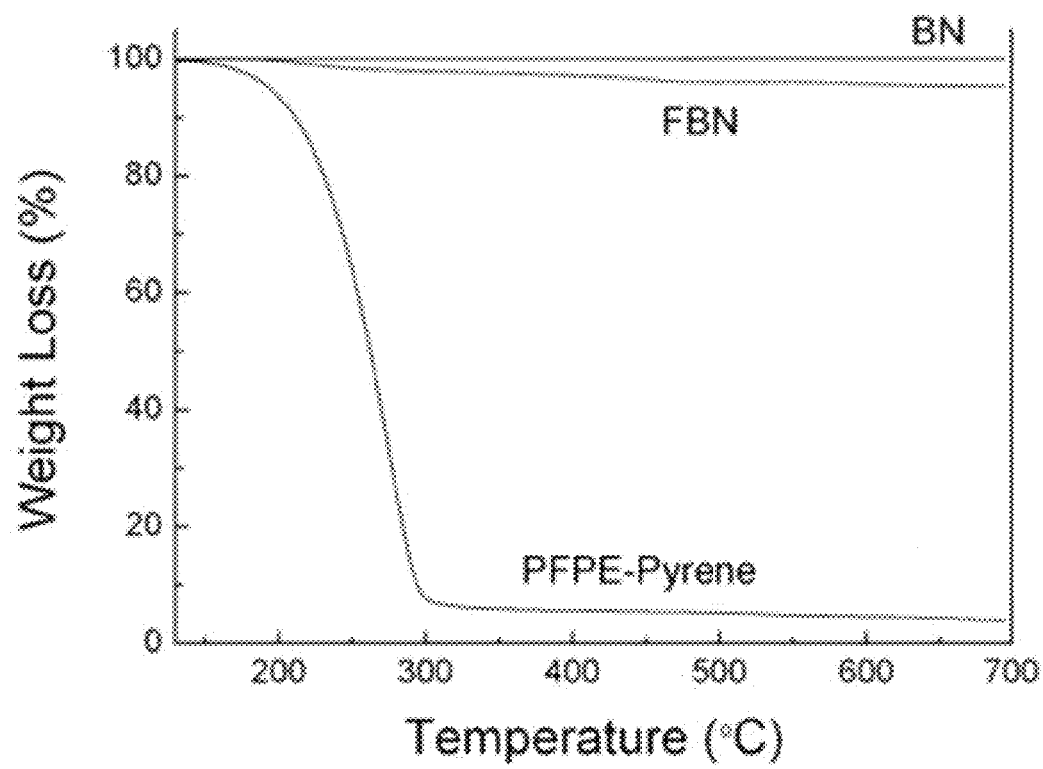

[Figure 8]
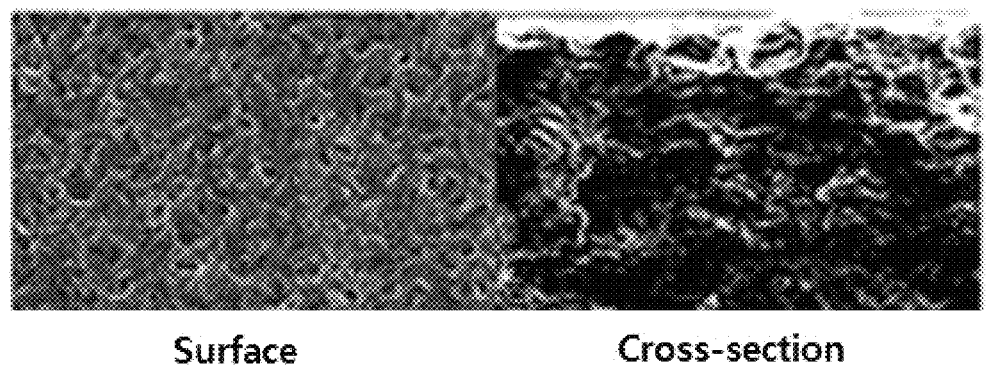
Surface          Cross-section
[Figure 9a]
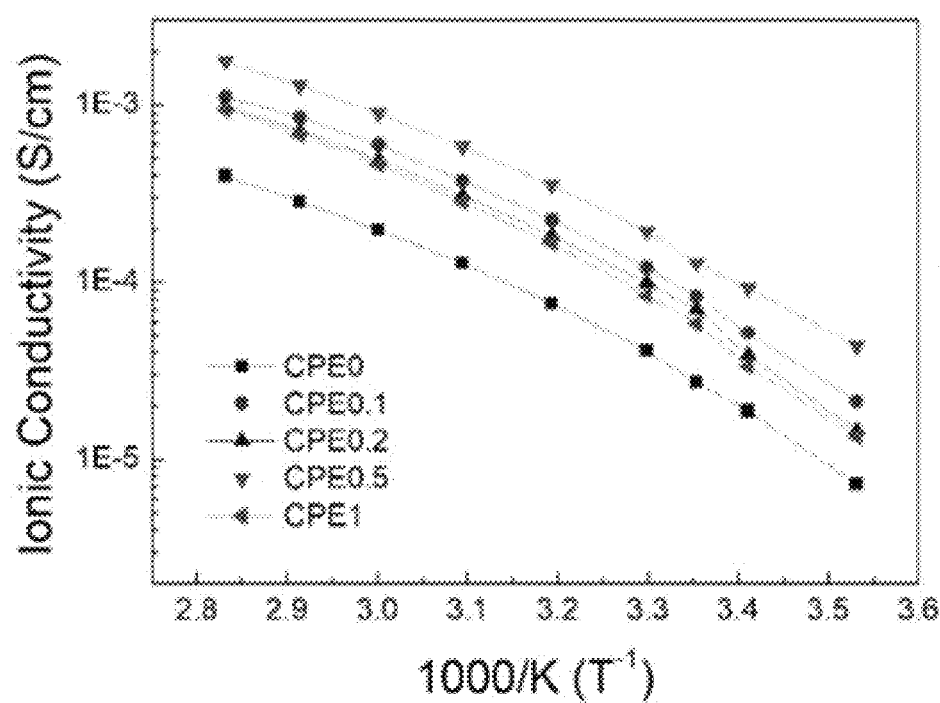

[Figure 9b]
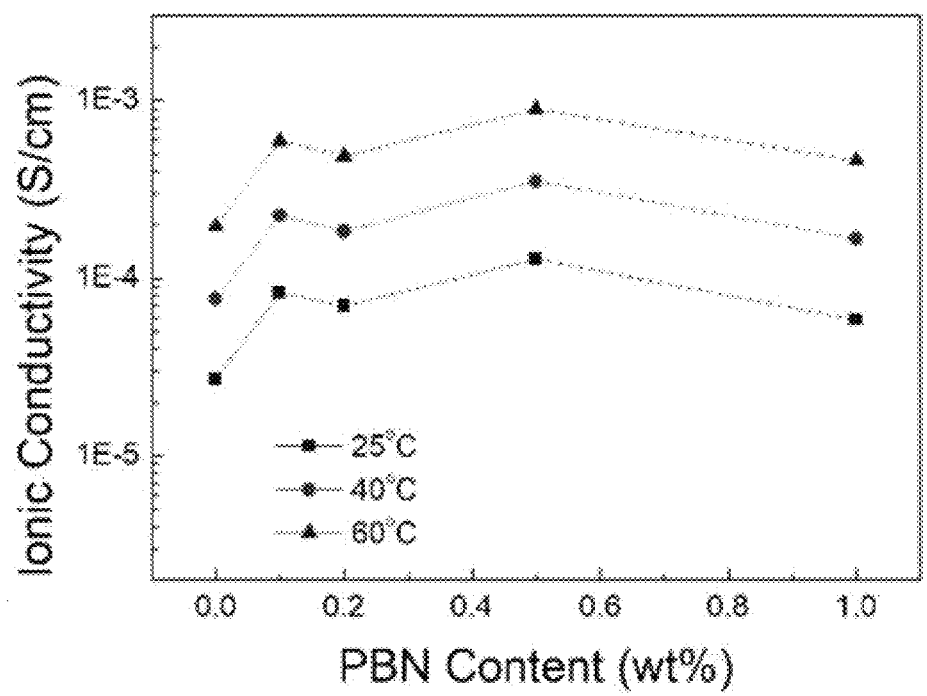

[Figure 10]
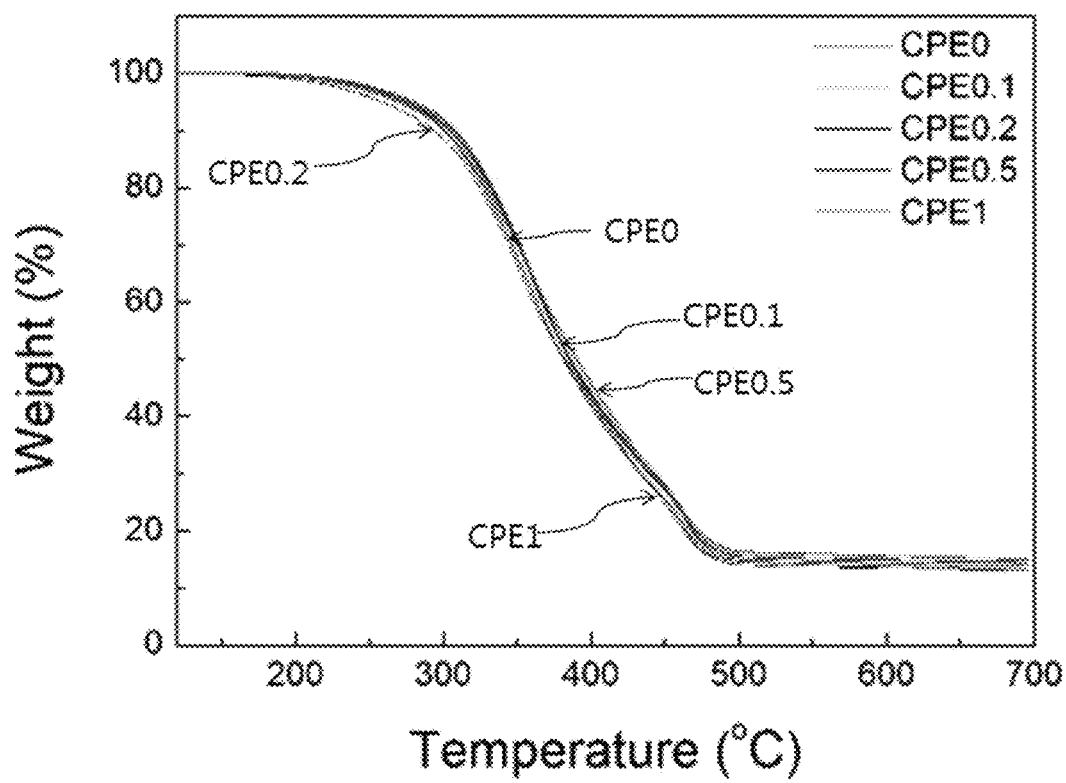
[Figure 11]
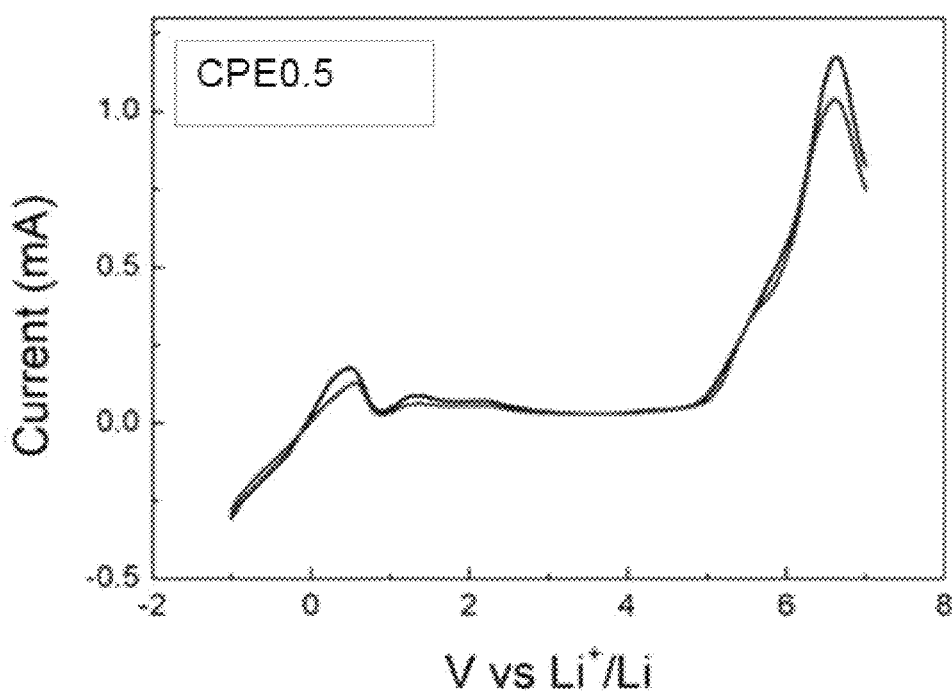

[Figure 12a]
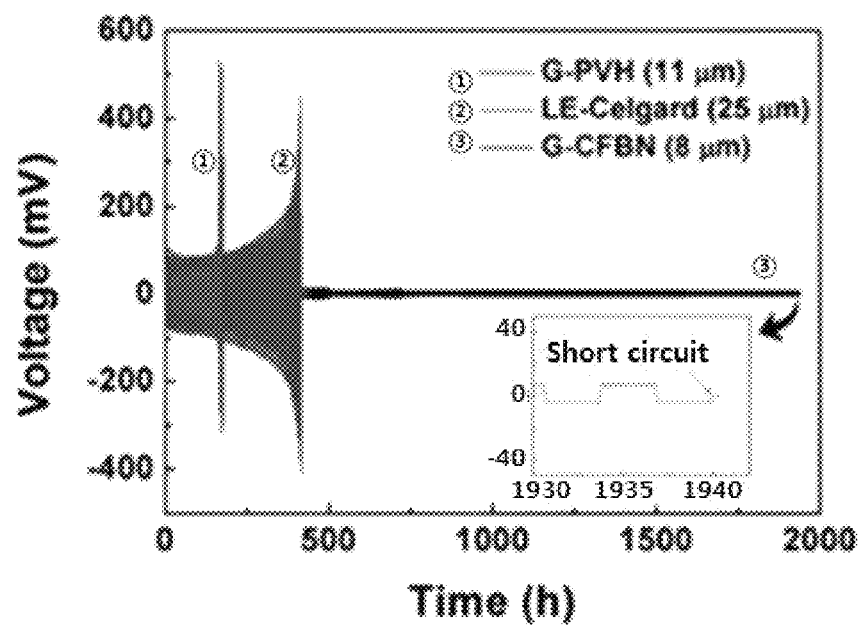

【Figure 12b】
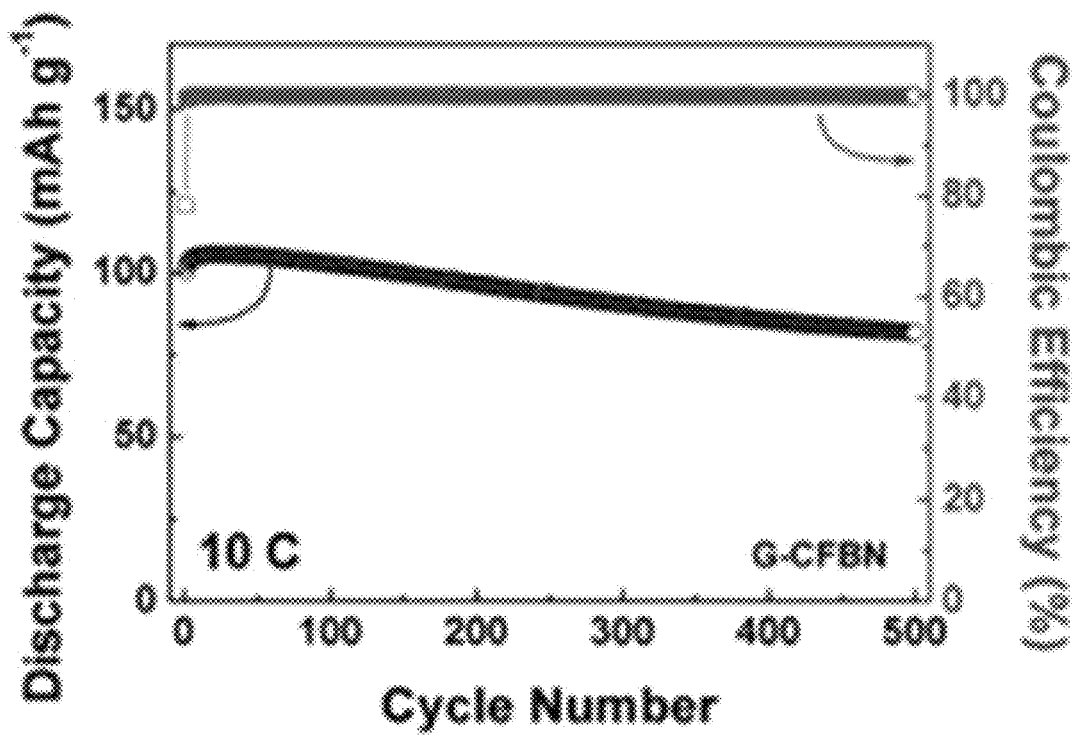
【Figure 13】
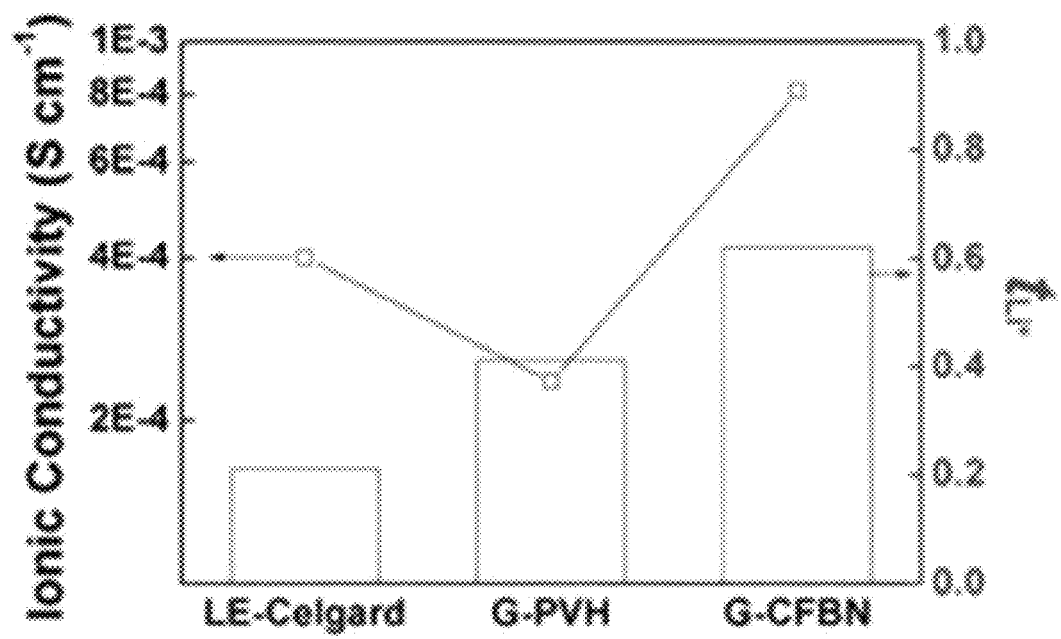

[Figure 14]
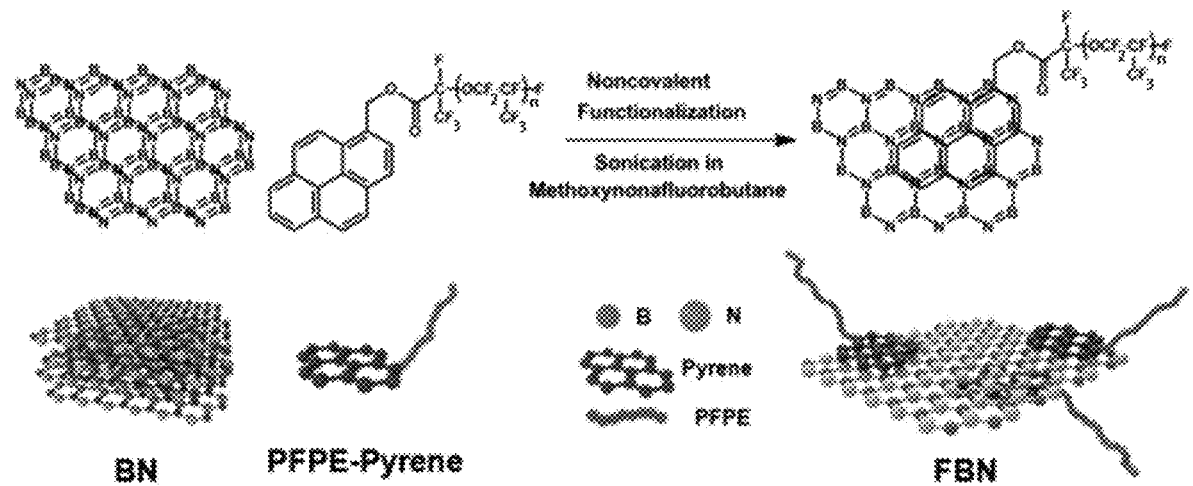
[Figure 15]
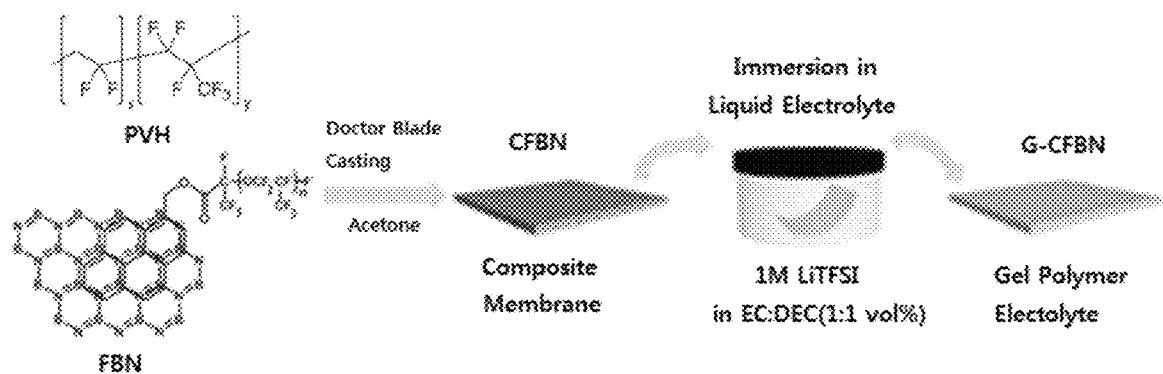

SOLID ELECTROLYTE AND METHOD FOR MANUFACTURING SAME

TECHNICAL FIELD

This application claims the benefit of priority based on Korean Patent Application No. 10-2018-0115701, filed on Sep. 28, 2018, the entire contents of which are incorporated herein by reference.

The present invention relates to a solid electrolyte excellent in ion conductivity and a preparation method thereof.

BACKGROUND ART

For current portable electronic devices, a lithium ion secondary battery with high energy density is commonly used. The liquid electrolyte, which is mainly used in this case, has problems such as the risk of leakage and explosion. In order to protect them, a safety circuit device is required, and the weight of the battery is inevitably increased by being sealed with a metal sheath can to prevent the leakage. In addition, since the thickness of the battery becomes thick, there is a limitation in battery design. In addition, as batteries become thinner and flexible in the future, the lithium ion battery, which currently uses liquid as an electrolyte, cannot meet all of the requirements such as miniaturization, light weight, and flexibility.

On the other hand, a lithium polymer battery has high average voltage and high energy density. Also, in addition to the properties of a lithium ion battery with no memory effect, the lithium polymer battery can prevent leakage of the electrolyte to the outside of the battery, thereby improving the stability of the battery. Also, in the case of the lithium polymer battery, since the electrode and the separator are integrated, the surface resistance is reduced, thereby being advantageous for high efficiency charging and discharging with relatively low internal resistance. In addition, the electrolyte film can be thinned to make flexible devices and batteries of any shape, and since the metal sheath can is not used, the thickness of the battery may be thinner. Therefore, batteries for portable electronic devices such as mobile phones, notebook computers, and digital cameras, which are increasing in demand by the consumer for stability, miniaturization, and high capacity, are expected to be largely replaced by lithium polymer batteries from existing lithium ion batteries. Also, the lithium polymer battery is expected to be applied to a high capacity lithium secondary battery for a hybrid electric vehicle and the like, and thus is gaining popularity as a next-generation battery.

Currently commercially available lithium ion battery uses a liquid electrolyte in which lithium salt is dissolved in an organic carbonate-based solvent, but has safety problems such as leakage, volatilization, and explosion due to external stimulus or temperature increase. Therefore, it is necessary to study solid phase polymer electrolyte to solve this problem.

Eventually, it is ideal to implement an all-solid-state battery system based on this solid-phase polymer electrolyte. For this purpose, it is urgent to develop a solid-phase polymer electrolyte having high ion conductivity ($>10^{-4}$ S/cm, 25° C.). In the case of the polymer solid electrolyte, a composite comprising a filler such as graphene oxide and tannic acid has been developed to overcome low ion conductivity in the range of $10^{-5}$ to $10^{-6}$ S/cm at room temperature.

For example, Japanese Patent No. 5853639 discloses a separator for a lithium ion battery having an electrolyte comprising a boron nitride filler.

The introduction of such a filler can not only improve the ion conductivity of the solid electrolyte, but also improve the mechanical strength. However, due to the limitation of the properties of the filler itself and the problem of dispersibility, it is still difficult to obtain a high ion conductivity in the solid electrolyte.

Therefore, there is a need for technology development to improve the ion conductivity of the solid electrolyte through the development of a filler that can further increase the free volume of the solid electrolyte compared to the filler contained in the existing solid electrolyte.

PRIOR ART DOCUMENT (Patent document 1) Japanese Patent No. 5853639.

DISCLOSURE

Technical Problem

As a result of various studies to solve the above problems, the inventors of the present invention confirmed that the polysiloxane-based solid electrolyte in which boron nitride (BN) was introduced exhibits high thermal stability and ion conductivity.

Accordingly, it is an object of the present invention to provide a solid electrolyte having improved ion conductivity and a method for preparing the same.

In addition, it is another object of the present invention to provide a lithium secondary battery comprising the solid electrolyte.

Technical Solution

In order to achieve the above objects, the present invention provides a solid electrolyte comprising polysiloxane, wherein the solid electrolyte comprises boron nitride (BN).

The solid electrolyte may comprise a polysiloxane polymer matrix; a lithium salt; an organic solvent; a crosslinking agent; and boron nitride (BN) as a filler.

The boron nitride may be contained in an amount of 0.1 to 5% by weight based on the total weight of the polysiloxane.

The boron nitride may be a boron nitride surface-modified by combining polycyclic aromatic hydrocarbons.

The polycyclic aromatic hydrocarbon may be at least one selected from the group consisting of pyrene, perylene and benzoperylene.

The polycyclic aromatic hydrocarbon may be one in which polyethylene glycol (PEG) is bonded and its end are modified.

The polycyclic aromatic hydrocarbon may be contained in an amount of 4 to 10% by weight based on the total weight of the surface-modified boron nitride.

The molecular weight (Mn) of the polysiloxane may be 800 to 1200 g/mol.

The lithium salt may be at least one selected from the group consisting of $LiN(SO_2CF_3)_2$ (LiTFSI), LiSCN, $LiN(CN)_2$, $LiClO_4$, $LiBF_4$, $LiAsF_6$, $LiPF_6$, $LiCF_3SO_3$, $Li(CF_3SO_2)_3C$, $LiN(SO_2CF_3)_2$, $LiN(SO_2CF_2CF_3)_2$, $LiSbF_6$ and $LiPF_3(CF_2CF_3)_3$, $LiPF_3(C_2F_5)_3$, $LiPF_3(CF_3)_3$, and $LiB(C_2O_4)_2$.

The organic solvent may be at least one selected from the group consisting of methanol, acetone, 4-acetylmorpholine, 2-methylpyridine-1-oxide, 2-pyrrolidon, 1-(2-hydroxyethyl)-2-pyrrolidinone, propylene carbonate (PC), ethylene carbonate (EC), 2-oxepanone, butanone, 2-pentanone, methyl ethyl ketone (MEK) and methoxynonafluorobutane.

The crosslinking agent may be tetraallyl oxy ethane (TAOE).

The present invention provides a method for preparing a solid electrolyte comprising the steps of (S1) reacting a boron nitride with a polycyclic aromatic hydrocarbon to combine with the polycyclic aromatic hydrocarbon and thus form a surface-modified boron nitride; (S2) dissolving a polysiloxane, a crosslinking agent and a photo-initiator in an organic solvent to form a mixed solution; (S3) adding a surface-modified boron nitride and a lithium salt to the mixed solution to form a slurry; and (S4) casting the slurry onto a substrate and then curing the slurry.

The initiator may be at least one photo-initiator selected from the group consisting of 2,2-dimethoxy-2-phenylacetophenone, 1-hydroxy-cyclohexyl phenyl ketone and 2,4,6-trimethylbenzoyldiphenyl-phosphineoxide.

The present invention provides a lithium secondary battery comprising the solid electrolyte.

Advantageous Effects

According to the solid electrolyte according to the present invention, a polysiloxane-based solid electrolyte with improved ion conductivity can be obtained by introducing a boron nitride into the polysiloxane-based solid electrolyte.

In addition, by modifying the surface of the boron nitride with polyethylene glycol-pyrene (PEG-pyrene), it may be more advantageous to improve the ion conductivity of the solid electrolyte by increasing the dispersibility in the solid electrolyte.

In addition, a solid electrolyte in the form of a freestanding film may be prepared by using a solvent such as methanol, when casting in the preparation process of the solid electrolyte, and performing a crosslinking reaction through UV irradiation after drying.

DESCRIPTION OF DRAWINGS

FIG. 1 is a 1H-NMR graph for polyethylene glycol (PEG-COOH) surface-modified with carboxyl group and 1-pyrenemethanol (PEG-pyrene) surface-modified with PEG, synthesized in Preparation Example 1.

FIG. 2 is a C-NMR graph for perfluoropolyether-pyrene (PFPE-pyrene) synthesized in Comparative Preparation Example 1.

FIG. 3 is a 1H-NMR graph for polysiloxane (BPS) synthesized in Preparation Example 2.

FIG. 4 is a 1H-NMR graph of allyl polyethylene glycol (APEG) synthesized in Preparation Example 3.

FIG. 5 is a Thermo Gravimetric Analyzer (TGA) graph for BN surface-modified with PEG synthesized in Example 1.

FIG. 6a shows FT-IR graphs of the solid electrolyte membranes prepared in Examples 1 to 4, FIG. 6b shows Raman Spectrum of the solid electrolyte membranes prepared in Examples 1 to 4, and FIG. 6c shows the FT-IR graph of the solid electrolyte membrane prepared in Comparative Example 1.

FIGS. 7a to 7c are a transmission electron microscope (TEM) photograph, Raman Spectrum, and TGA graph, respectively, for boron nitride (FBN) surface-modified with perfluoropolyether-pyrene (PFPE-pyrene), which is a filler used in the preparation of the gel polymer electrolyte of Comparative Example 2.

FIG. 8 is a field emission scanning electron microscope (FE-SEM) photograph of the gel polymer electrolyte prepared in Comparative Example 2.

FIGS. 9a and 9b shows graphs of the ion conductivity and graphs of the ion conductivity depending on the temperature, respectively, for the solid electrolytes prepared in Examples 1 to 4 and Comparative Example 1.

FIG. 10 shows thermogravimetric (TGA) graphs for solid electrolytes prepared in Examples 1 to 4 and Comparative Example 1.

FIG. 11 shows the current-potential curve measured by linear sweep voltammetry for the solid electrolyte membrane of Example 3.

FIGS. 12a and 12b are graphs showing the experimental results of the inhibition and life performance of lithium dendrites for cells comprising the gel polymer electrolytes (G-CFBN, G-PVH, LE-Celgard) of Comparative Examples 2, 3 and 4, respectively.

FIG. 13 is a graph illustrating ion conductivity and cation transport rate measured for cells comprising gel polymer electrolytes (G-CFBN, G-PVH, LE-Celgard) of Comparative Examples 2, 3 and 4.

FIG. 14 shows a surface modification reaction of boron nitride (BN).

FIG. 15 shows preparation of a gel polymer electrolyte (G-CFBN).

BEST MODE

Hereinafter, the present invention will be described in detail in order to facilitate understanding of the present invention.

The terms and words used in the present specification and claims should not be construed as being limited to ordinary or dictionary terms, and should be construed in a sense and concept consistent with the technical idea of the present invention, based on the principle that the inventor can properly define the concept of a term to describe his invention in the best way.

Polymer Electrolyte

The present invention relates to a solid electrolyte containing a polysiloxane, which comprises a boron nitride (BN) as a filler for improving ion conductivity.

Specifically, the solid electrolyte according to the present invention comprises a polysiloxane; a lithium salt; an organic solvent; a crosslinking agent; and a boron nitride (BN) as a filler.

In the present invention, the boron nitride has a plate-like structure, which can exhibit excellent thermal stability, exhibit a property of no electrical conductivity, and improve ion conductivity by increasing the free volume of the solid electrolyte.

The boron nitride may be contained in an amount of 0.1 to 5% by weight, preferably 0.1 to 4% by weight, more preferably 0.1 to 3% by weight based on the total weight of the polysiloxane. If the amount of the boron nitride is less than the above range, the ion conductivity improvement effect of the solid electrolyte is insignificant, and even if the amount of the boron nitride exceeds the range, the ion conductivity may decrease as the weight of the boron nitride increases. Specifically, the weight of the boron nitride refers to the weight when the total weight of the polysiloxane is 100% by weight.

In addition, the boron nitride may be surface modified to improve dispersibility in the solid electrolyte. Specifically, the boron nitride may be physically bonded to the polycyclic aromatic hydrocarbon and thus be surface-modified.

The polycyclic aromatic hydrocarbon may be at least one selected from the group consisting of pyrene, perylene and benzoperylene, preferably pyrene.

In addition, the polycyclic aromatic hydrocarbon may be one whose end is modified by the combination of polyethylene glycol (PEG). For example, polyethylene glycol-pyrene formed by combining polyethylene glycol at the end of 1-pyrenemethanol as the polycyclic aromatic hydrocarbon may be advantageous for modifying the surface of boron nitride and thus improving dispersibility.

In addition, in the boron nitride surface-modified with the polycyclic aromatic hydrocarbon, the content of the polycyclic aromatic hydrocarbon may be 4 to 10% by weight, preferably 4 to 9% by weight, more preferably 4 to 8% by weight. If the content is less than the above range, the dispersibility of boron nitride may be lowered. If the content exceeds the above range, the ion conductivity of the solid electrolyte may be lowered. In this case, the polycyclic aromatic hydrocarbon may be modified with polyethylene glycol.

In addition, the boron nitride may have a size of 30 to 100 nm, preferably 40 to 90 nm, and more preferably 50 to 80 nm. If the size of the boron nitride is less than the above range, the ion conductivity improvement effect of the solid electrolyte may be insignificant, and even if the size of the boron nitride exceeds the range, the ion conductivity may decrease as the size of the boron nitride increases. In this case, the size of the boron nitride refers to the length of the longest axis of the boron nitride.

In the present invention, the polysiloxane is an ion conductive polymer and may be contained in a solid electrolyte in the form of a polysiloxane matrix.

The molecular weight (Mn) of the polysiloxane may be 800 to 1200 g/mol, preferably 850 to 1150 g/mol, and more preferably 900 to 1100 g/mol. If the molecular weight (Mn) of the polysiloxane is less than the above range, the durability of the solid electrolyte may be lowered. If the molecular weight (Mn) of the polysiloxane is more than the above range, the ion conductivity may be lowered.

In addition, the polysiloxane may be contained in an amount of 15 to 20% by weight, preferably 16 to 19% by weight, more preferably 17 to 19% by weight based on the total weight of the solid electrolyte. If the amount of the polysiloxane is less than the above range, the durability of the solid electrolyte may be lowered. If the amount of the polysiloxane exceeds the above range, the ion conductivity may be lowered.

In addition, the solid electrolyte may further comprise polymers in addition to the polysiloxane, for example, the polymer may be at least one selected from the group consisting of allyl polyethylene glycol (APEG), polyethylene glycol (PEG), ethylene glycol (EG) and polyethylene glycol diacrylate (PEGDA).

The lithium salt used as an ion supply compound in the solid electrolyte of the present invention can improve lithium ion conductivity.

The lithium salt may be at least one selected from the group consisting of LiSCN, LiN(CN)$_2$, LiClO$_4$, LiBF$_4$, LiAsF$_6$, LiPF$_6$, LiCF$_3$SO$_3$, LiN(SO$_2$F)$_2$, Li(CF$_3$SO$_2$)$_3$C, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(C$_2$F$_5$)$_3$, LiPF$_3$(CF$_3$)$_3$ and LiB(C$_2$O$_4$)$_2$. Preferably, the lithium salt may be LiN(SO$_2$F)$_2$ or LiN(SO$_2$CF$_3$)$_2$, which may be more advantageous in improving ionic conductivity and mechanical properties of the polymer electrolyte.

In addition, the lithium salt is preferably contained in an amount of 10 to 30% by weight, preferably 15 to 25% by weight, more preferably 17 to 23% by weight in the total solid electrolyte. If the content of the lithium salt is less than the above range, it is not easy to secure the lithium ion conductivity. On the contrary, when the content of the lithium salt exceeds the above range, there is no significant increase in effect and thus it is uneconomical. Therefore, the lithium salt content is appropriately selected within the above range.

In the present invention, a solvent capable of dissolving the lithium salt may be used as the organic solvent.

The organic solvent may be at least one selected from the group consisting of methanol, acetone, 4-acetylmorpholine, 2-methylpyridine-1-oxide, 2-pyrrolidon, 1-(2-hydroxyethyl)-2-pyrrolidinone, propylene carbonate (PC), ethylene carbonate (EC), 2-oxepanone, butanone, 2-pentanone, methyl ethyl ketone (MEK) and methoxynonafluorobutane. Preferably, the organic solvent may be methoxynonafluorobutane.

The content of the organic solvent is limited in consideration of the viscosity of the finally obtained solid electrolyte. That is, the lower the content of the solvent, the higher the viscosity of the composition finally obtained, thus making the manufacturing process of the solid electrolyte membrane difficult. On the contrary, the greater the content of the solvent, the lower the viscosity, which may also lower workability.

Also, in the solid electrolyte of the present invention, the viscosity of the solution at 30° C. is not particularly limited, but may be preferably 200 to 1,000 cP, preferably 300 to 800 cP, and more preferably 500 to 700 cP. This control of viscosity allows to secure the viscosity to increase the film processability in producing a solid electrolyte membrane.

If the viscosity exceeds the above range, the transverse direction (TD) thickness may be uneven due to the deterioration of the flatness of the coating liquid and the fluidity may be lost, so that uniform coating may be difficult. On the contrary, if the viscosity is lower than the above range, it causes a problem that it is impossible to prevent the occurrence of stains due to excessive flow of the coating liquid during coating and the mechanical direction (MD) thickness becomes uneven.

In the present invention, the crosslinking agent may improve the mechanical properties of the solid electrolyte by facilitating the formation of the solid electrolyte membrane.

The crosslinking agent may be tetraallyl oxy ethane (TAOE).

In addition, the crosslinking agent may be contained in an amount of 5 to 10% by weight, preferably 6 to 9% by weight, more preferably 7 to 8% by weight based on the total weight of the solid electrolyte. If the amount of the crosslinking agent is less than the above range, it may be difficult to form a solid electrolyte. If the amount of the crosslinking agent exceeds the above range, the ion conductivity may be lowered.

Preparation Method of Polymer Electrolyte

The present invention also relates to a method for preparing a solid electrolyte having improved ion conductivity, while maintaining mechanical properties equal to or higher than a conventional solid electrolyte. The method for preparing the solid electrolyte may comprise the steps of (S1) reacting a boron nitride with a polycyclic aromatic hydrocarbon to combine with the polycyclic aromatic hydrocarbon and thus form a surface-modified boron nitride; (S2) dissolving a polysiloxane, a crosslinking agent and a photo-initiator in an organic solvent to form a mixed solution; (S3) adding a surface-modified boron nitride and a lithium salt to the mixed solution to form a slurry; and (S4) casting the slurry onto a substrate and then crosslinking.

Hereinafter, the method for preparing the polymer electrolyte will be described in more detail at each step. The kind, physical properties and weight of the material used in each step below are the same as described above.

Step (S1)

In step (S1), a boron nitride may be reacted with a polycyclic aromatic hydrocarbon to combine with the polycyclic aromatic hydrocarbon and thus form a surface-modified boron nitride.

In order to improve the dispersibility of boron nitride in the solid electrolyte, the surface of the boron nitride is modified. At this time, For surface modification, the boron nitride and the polycyclic aromatic hydrocarbon are reacted and physically combined. The polycyclic aromatic hydrocarbon may be one whose end is modified by the combination of polyethylene glycol.

Specifically, the supernatant obtained after sonicating and centrifuging the solution containing boron nitride and polyethylene glycol-pyrene may be filtered, washed, and dried to obtain a surface-modified boron nitride.

The polyethylene glycol-pyrene is one in which the end of the 1-pyrenemethanol is modified with the polyethylene glycol by reacting polyethylene glycol, whose end was modified with a carboxyl group, with 1-pyrenemethanol.

Step (S2)

In step (S2), the polysiloxane, the crosslinking agent and the initiator may be dissolved in an organic solvent to form a mixed solution. Types, features and weights of the polysiloxane, crosslinking agent and organic solvent are as described above.

In the present invention, the initiator may induce a reaction of the polysiloxane and the crosslinking agent to form a solid electrolyte matrix, and preferably the initiator may be a photo-initiator.

The photo-initiator may be at least one selected from the group consisting of 2,2-dimethoxy-2-phenylacetophenone, 1-hydroxy-cyclohexyl phenyl ketone and 2,4,6-trimethyl-benzoyldiphenyl-phosphineoxide, and preferably may be 2,2-dimethoxy-2-phenylacetophenone.

The initiator may be used to be 5 to 15% by weight, preferably 7 to 13% by weight, and more preferably 9 to 11% by weight based on the weight of the polysiloxane finally prepared. If the amount of the initiator is less than the above range, the solid electrolyte itself cannot be formed. If the amount of the initiator exceeds the above range, even if the initiator is added in excess, the formation reaction of the solid electrolyte does not proceed more or faster, and thus there is no benefit from increasing initiator content.

Step (S3)

In step (S3), the surface-modified boron nitride and the lithium salt may be added to the mixed solution to form a slurry. The physical properties, characteristics, and weights of the surface-modified boron nitride and the lithium salt are as described above.

In this case, after the boron nitride is dispersed in the organic solvent, the lithium salt may be added to form a slurry.

The organic solvent may be at least one selected from the group consisting of methanol, acetone, 4-acetylmorpholine, 2-methylpyridine-1-oxide, 2-pyrrolidon, 1-(2-hydroxyethyl)-2-pyrrolidinone, propylene carbonate (PC), ethylene carbonate (EC), 2-oxepanone, butanone, 2-pentanone and methyl ethyl ketone (MEK), and preferably, the organic solvent may be methanol.

Step (S4)

In step (S4), the slurry may be cast on the substrate and then cured.

Specifically, the slurry may be cast on a substrate, and the solvent may be removed by evaporation at atmospheric conditions, followed by UV irradiation and curing to prepare a solid electrolyte.

The substrate is not particularly limited as long as the substrate is capable of casting a slurry. For example, the substrate may be a glass substrate or a release film. For example, the release film may be a the release film formed by polyester resins such as polyethylene terephthalate, polybutylene terephthalate, polyethylene naphthalate and polybutylene naphthalate; polyimide resin; acrylic resin; styrene resins such as polystyrene and acrylonitrile-styrene; polycarbonate resin; polylactic acid resin; polyurethane resin; polyolefin resins such as polyethylene, polypropylene, and ethylene-propylene copolymer; vinyl resins such as polyvinyl chloride and polyvinylidene chloride; polyamide resins; sulfonic resin; polyether-ether ketone resin; allylate-based resin; or a mixture thereof.

In addition, the method of casting the slurry onto the substrate may be selected from the group consisting of spraying method, screen printing method, doctor blade method, and slot die method. However, there is no particular limitation as long as it is a method of applying a solution or slurry on a substrate, which can be used in the art.

When the slurry cast on the substrate is cured, the formed solid electrolyte may be peeled off from the substrate.

The curing may be heat-curing or photo-curing. The heat-curing may be performed by heating to a temperature of 50 to 80° C., preferably 55 to 75° C., and more preferably 60 to 70° C. If the above-mentioned heat-curing temperature is lower than the above-mentioned range, the solid electrolyte cannot be obtained because the curing is not performed as much as desired. If the heat-curing temperature is higher than the above range, the physical properties of the solid electrolyte itself may be denatured. The photo-curing may be UV curing.

Lithium Secondary Battery

The present invention also relates to a lithium secondary battery comprising the solid electrolyte as described above.

The lithium secondary battery according to the present invention includes a positive electrode, a negative electrode, and an electrolyte interposed therebetween, wherein the electrolyte may be the solid electrolyte as described above.

The polymer electrolyte exhibits high lithium ion conductivity while satisfying both electrochemically excellent voltage stability and cation transportation rate, and thus can be preferably used as an electrolyte of the battery to improve the performance of the battery.

In addition, in order to further increase the lithium ion conductivity, the electrolyte may further comprise a substance used for this purpose.

If desired, the polymer electrolyte further comprises an inorganic solid electrolyte or an organic solid electrolyte.

The inorganic solid electrolyte may be a ceramic material, which is a crystalline material or an amorphous material, and may be inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O12$, $Li_7La_3Zr_2O_{12}$, $Li_6BaLa_2Ta_2O_{12}$, $Li_3PO_{(4-3/2w)}Nw$ (wherein w is w<1), $Li_{3.6}Si_{0.6}P_{0.4}O_4$.

Examples of the organic solid electrolyte may be organic solid electrolytes prepared by mixing lithium salt to polymeric materials such as polyethylene derivatives, polyethylene oxide derivatives, polypropylene oxide derivatives, phosphate ester polymers, polyalginate lysine, polyester sulfide, polyvinyl alcohol, and polyvinylidene fluoride. In this case, these may be used alone or in combination of at least one.

The specific application method of the polymer electrolyte is not particularly limited in the present invention, and can be selected from methods known to those skilled in the art.

The lithium secondary battery to which the polymer electrolyte can be applied as an electrolyte has no limitations on positive or negative electrodes, and especially is applicable to lithium-air battery, lithium oxide battery, lithium-sulfur battery, lithium metal battery, and all-solid-state battery which operate at high temperature.

The positive electrode of the lithium secondary battery may comprise, but is not limited to, a layered compound such as lithium cobalt oxide ($LiCoO_2$) and lithium nickel oxide ($LiNiO_2$), or a compound substituted by one or more transition metals; lithium manganese oxide such as chemical formula of $Li_{1+x}Mn_{2-x}O_4$ (0≤x≤0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni-site lithium nickel oxide represented by chemical formula of $LiNi_{1-x}M_xO_2$ (M=Co, Mn, Al, Cu, Fe, Mg, B or Ga; 0.01≤x≤0.3); lithium manganese composite oxide represented by chemical formula of $LiMn_{2-x}M_xO_2$ (M=Co, Ni, Fe, Cr, Zn or Ta; 0.01≤x≤0.1) or $Li_2Mn_3MO_8$ (M=Fe, Co, Ni, Cu or Zn); lithium manganese complex oxide of spinel structure represented by $LiNi_xMn_{2-x}O_4$; $LiMn_2O_4$ in which a portion of Li in the chemical formula is replaced by an alkaline earth metal ion; disulfide compound; chalcogenide such as $Fe_2(MoO_4)_3$, $Cu_2Mo_6S_8$, FeS, CoS and MiS, oxides, sulfides or halides of scandium, ruthenium, titanium, vanadium, molybdenum, chromium, manganese, iron, cobalt, nickel, copper, zinc and the like, and more specifically may comprise $TiS_2$, $ZrS_2$, $RuO_2$, $Co_3O_4$, $Mo_6S_8$, $V_2O_5$ or the like.

This positive electrode active material can be formed on a positive electrode current collector. The positive electrode current collector is not particularly limited as long as it has high conductivity without causing chemical change in the battery. For example, stainless steel, aluminum, nickel, titanium, sintered carbon; aluminum or stainless steel surface-treated with carbon, nickel, titanium, silver or the like may be used as the positive electrode current collector. At this time, the positive electrode current collector may be formed in various forms such as film having fine irregularities on its surface, sheet, foil, net, porous body, foam, or nonwoven fabric to enhance the bonding force with the positive electrode active material.

In addition, the negative electrode is manufactured by forming a negative electrode mixture layer with a negative electrode active material on the negative electrode current collector, or may be a negative electrode mixture layer (for example, lithium foil) alone.

At this time, the types of the negative electrode current collector and the negative electrode mixture layer are not particularly limited in the present invention, and known materials can be used.

In addition, the negative electrode current collector is not particularly limited as long as it has electrical conductivity without causing a chemical change in the battery. For example, copper, stainless steel, aluminum, nickel, titanium, sintered carbon, copper or stainless steel surface-treated with carbon, nickel, titanium, silver or the like; aluminum-cadmium alloy or the like may be used as the negative electrode current collector. Also, as with the positive electrode current collector, the shape of the negative electrode current collector can be various forms such as a film having fine irregularities on its surface, sheet, foil, net, porous body, foam, nonwoven fabric and the like.

In addition, the negative electrode active material may comprises, but is not limited to, crystalline artificial graphite, crystalline natural graphite, amorphous hard carbon, low crystalline soft carbon, carbon black, acetylene black, Ketjen black, Super-P, graphene, and fibrous carbon, Si-based material, metal composite oxides such as $LixFe_2O_3$ (0≤x≤1), $Li_xWO_2$(0≤x≤1), $Sn_xMe_{1-x}Me'_yO_z$ (Me: Mn, Fe, Pb, Ge; Me': Al, B, P, Si, elements of groups 1, 2, and 3 of the periodic table, halogen; 0<x≤1; 1≤y≤3; 1≤z≤8); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; an electrical conductivity polymer such as polyacetylene; Li—Co—Ni based material; titanium oxide; lithium titanium oxide.

In addition, the negative electrode active material may be metal composite oxides such as $Sn_xMe_{1-x}Me'_yO_z$ (Me: Mn, Fe, Pb, Ge; Me': Al, B, P, Si, elements of groups 1, 2, and 3 of the periodic table, halogen; 0<x≤1; 1≤y≤3; 1≤z≤8); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon, or carbon composite may be used alone or in combination of two or more.

At this time, the electrode material mixture layer may further comprise a binder resin, an electrically conductive material, a filler, and other additives.

The binder resin is used for the bonding of the electrode active material and the electrically conductive material and for the bonding to the current collector. Examples of such binder resins may comprise polyvinylidene fluoride (PVDF), polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber, fluorine rubber, and various copolymers thereof.

The electrically conductive material is used to further improve the electrical conductivity of the electrode active material. The electrically conductive material is not particularly limited as long as it has electrical conductivity without causing chemical changes in the battery, and for example, graphite such as natural graphite or artificial graphite; carbon blacks such as carbon black, acetylene black, Ketjen black, channel black, furnace black, lamp black, and thermal black; electrically conductive fibers such as carbon fiber and metal fiber; carbon fluoride; metal powders such as aluminum and nickel powder; electrically conductive whiskers such as zinc oxide and potassium titanate; electrically conductive metal oxides such as titanium oxide; polyphenylene derivative can be used.

The filler is selectively used as a component for suppressing the expansion of the electrode and is not specifically limited as long as it is a fibrous material without causing chemical change in the battery, and for example, includes olefin-based polymers such as polyethylene and polypropylene; and fibrous materials such as glass fiber and carbon fiber.

The shape of the lithium secondary battery as described above is not particularly limited and may be, for example, a jelly-roll type, a stack type, a stack-folding type (comprising a stack-Z-folding type), or a lamination-stacking type, and preferably a stack-folding type.

The electrode assembly in which the negative electrode, polymer electrolyte, and the positive electrode are sequentially stacked is prepared, and the electrode assembly is inserted into the battery case, and then sealed with cap plate and gasket to obtain the lithium secondary battery.

In this case, the lithium secondary battery can be classified into various types of batteries such as lithium-sulfur battery, lithium-air battery, lithium-oxide battery, and lithium all-solid-state battery depending on the type of positive electrode/negative electrode materials used, can be classified into cylindrical, rectangular, coin-shaped, pouch type depending on the type, and can be divided into bulk type and thin film type depending on the size. The structure and preparing method of these batteries are well known in the art, and thus detailed description thereof is omitted.

The lithium secondary battery according to the present invention can be used as a power source for devices requiring high capacity and high rate characteristics, etc. Specific examples of the device may comprise, but are not limited to, a power tool that is powered by a battery powered motor; electric cars comprising an electric vehicle (EV), a hybrid electric vehicle (HEV), a plug-in hybrid electric vehicle (PHEV), and the like; an electric motorcycle comprising an electric bike (E-bike) and an electric scooter (Escooter); an electric golf cart; and a power storage system.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention. Such variations and modifications are within the scope of the appended claims.

Preparation Example 1: Synthesis of Polyethylene Glycol-Pyrene (PEG-Pyrene)

Polyethylene glycol-pyrene (PEG-pyrene) was synthesized for use in modifying the surface of boron nitride for use as a filler for the solid electrolyte.

(1) Synthesis of PEG-Pyrene

Synthesis process of PEG-pyrene is shown in Scheme 1 below.

<Scheme 1>

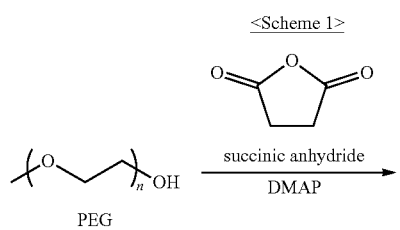

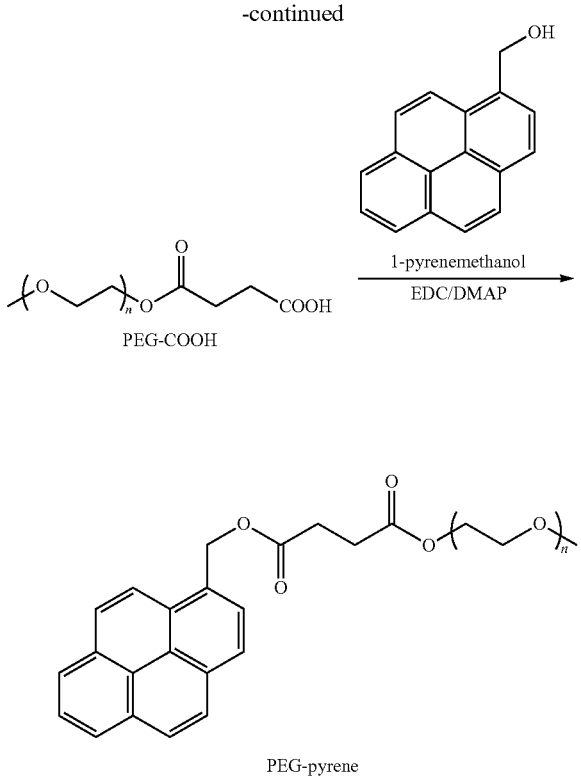

PEG-pyrene (1-1) Modification of Terminal of PEG with Carboxyl Group

PEG (Mn=400, n=8.3) was dissolved in chloroform as a solvent, and succinic anhydride and 4-dimethylaminopyridine (DMAP) as a catalyst were added and reacted at 25° C. for 24 hours. At this time, succinic anhydride was added at a ratio of 1.2 mol relative to 1 mol of PEG, and DMAP was added at a ratio of 10 mol relative to 1 mol of PEG.

After completion of the reaction, the resultant was dissolved in Methylene chloride (MC) and purified through extraction with water to obtain PEG modified at its ends by a carboxyl group (PEG-COOH).

(1-2) Modification of Terminal of 1-Pyrenemethanol with PEG

1-Pyrenmethanol was dissolved in dimethylformamide (DMF) as a solvent, and PEG modified at its ends by a carboxyl group (PEG-COOH) and EDC (Ethylene Dichloride)/DMAP as a catalyst were added and reacted at 50° C. for 21 hours. At this time, PEG modified at its ends by a carboxyl group (PEG-COOH) was added at a ratio of 1.5 mol relative to 1 mol of 1-pyrenemethanol, and EDC/DMAP was added at ratios of 1 mol and 0.1 mol, respectively.

After completion of the reaction, the resultant was dissolved in methylene chloride (MC) and purified through extraction with water, thereby modifying the end of 1-pyrenemethanol with PEG (PEG-pyrene).

(2) Confirmation of PEG-Pyrene Synthesis

FIG. 1 is a 1H-NMR graph for polyethylene glycol (PEG-COOH) surface-modified with carboxyl group and 1-pyrenemethanol (PEG-pyrene) surface-modified with PEG, synthesized in Preparation Example 1.

Referring to FIG. 1, it can be confirmed by 1H-NMR that PEG-COOH and PEG-pyrene are synthesized by the synthesis reaction carried out in Preparation Example 1.

Comparative Preparation Example 1: Synthesis of Perfluoropolyether-Pyrene (PFPE-Pyrene)

Perfluoropolyether-pyrene (PFPE-pyrene) was synthesized for use in modifying the surface of boron nitride for use as a filler for the solid electrolyte.

(1) Synthesis of PFPE-Pyrene

PFPE and 1-pyrenemethanol were dissolved in thionyl chloride (SOCl2) at a molar ratio of 1.2:1, and then reacted at 80° C. for 12 hours to synthesize PFPE-pyrene represented by Formula 1 below. The remaining thionyl chloride was evaporated and unreacted 1-pyrenemethanol was removed by washing with chloroform.

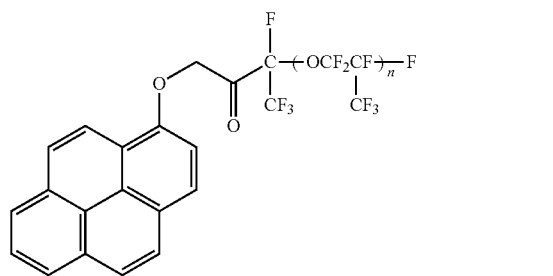

<Formula 1> wherein n is an integer of 10 to 30.

(2) Confirmation Experiment of PFPE-Pyrene Synthesis

FIG. 2 is a C-NMR graph for perfluoropolyether-pyrene (PFPE-pyrene) synthesized in Comparative Preparation Example 1.

Referring to FIG. 2, it can be confirmed by C-NMR that PFPE-pyrene is synthesized by the synthesis reaction carried out in Comparative Preparation Example 1.

Preparation Example 2: Synthesis of Polysiloxane (BPS, Branched Polysiloxane)

Hydrochloric acid (0.104 mol) was dissolved in an aqueous ethanol solution (4.3 g of water+18.4 g of ethanol), and (3-mercaptopropyl)methyldimethoxysilane (0.02 mol) and (3-mercaptopropyl)trimethoxysilane (0.02 mol) were added to the solution, and reacted at 50° C. for 3 hours. Thereafter, the reactant was precipitated in distilled water to remove impurities, and then to obtain a synthesized polysiloxane.

FIG. 3 is a $^1$H-NMR graph for polysiloxane (BPS) synthesized in Preparation Example 2.

Referring to FIG. 3, it can be confirmed that polysiloxane is synthesized by the synthesis reaction of Preparation Example 2.

Preparation Example 3: Synthesis of Allyl Polyethylene Glycol (APEG, Allyl Functionalized Poly(Ethylene Glycol))

Poly(ethylene glycol)methyl ether (Mw 350 g/mol, 35 g, 0.10 mol) and allyl bromide (0.11 mol) were dissolved in 100 ml of toluene, NaOH (0.11 mol) was dissolved and reacted at 45° C. for 16 hours. Thereafter, the reaction product was extracted with NaCl aqueous solution and dichloromethane and purified to obtain a synthesized APEG.

FIG. 4 is a 1H-NMR graph of allyl polyethylene glycol (APEG) synthesized in Preparation Example 3.

Referring to FIG. 4, it can be confirmed that APEG is synthesized by the synthesis reaction of Preparation Example 3.

Examples 1-4

The solid electrolyte was prepared by the following method in accordance with the composition ratio as described in Table 1 below.

1) Modification of Surface of Boron Nitride

A surface modification reaction of boron nitride (BN) was performed according to Scheme 2 below.

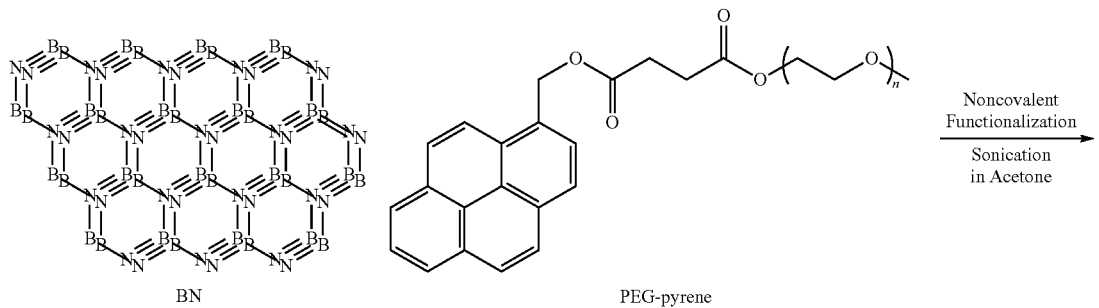

<Scheme 2>

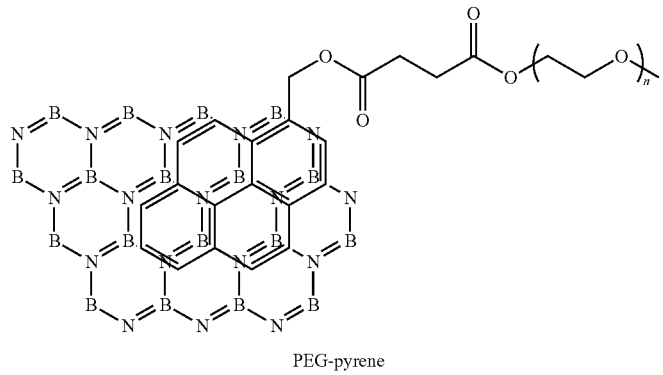

PEG-pyrene 0.1 g of BN and 0.1 g of PEG-pyrene obtained in Preparation Example 1 were dissolved in 100 ml of water, and sonification was performed for 20 hours.

Thereafter, the supernatant was collected three times while centrifuging at 10000 rpm for 15 minutes, and then dried at 50° C. to obtain boron nitride surface-modified with PEG-pyrene (PBN).

At this time, the BN and PEG-pyrene are combined by noncovalent functionalization, thereby modifying the surface of the BN.

(2) Preparation of Mixed Solution of Polysiloxane, Cross-linking Agent and Photo-Initiator To 0.1 g of polysiloxane (Mn=1000 g/mol) obtained in Preparation Example 2, allyl polyethylene glycol (APEG) obtained in Preparation Example 3 and tetraallyloxyethane (TAOE) were mixed at a molar ratio of 4:1. 2,2-dimethoxy-2-phenylacetophenone (DMPA) as a photo-initiator was further mixed in an amount of 10% by weight relative to polysiloxane, and then dissolved in 0.4 g of methanol to obtain a mixed solution.

(3) Preparation of Slurry Comprising Surface Modified Boron Nitride

The surface-modified BN (PBN) obtained in (1) above and LiTFSI ([EO/Li]=0.07) as lithium salt were added to the mixed solution obtained in (2) and sonicated for 3 hours to obtain a slurry. At this time, EO means ethylene oxide, [EO/Li] means the molar ratio of EO and Li.

(4) Preparation of a Solid Electrolyte

The slurry obtained in (3) was cast on a 2.5 cm×2.5 cm glass, and cured by UV irradiation for 1 hour to prepare a solid electrolyte membrane.

TABLE 1

| Unit:weight (g) | | Comparative Example 1 (CPE0) | Example 1 (CPE0.1) | Example 2 (CPE0.2) | Example 3 (CPE0.5) | Example 4 (CPE1) | Comparative Example 2 |
|---|---|---|---|---|---|---|---|
| Filler[note 1] | PBN | 0 | 0.0001 | 0.0002 | 0.0005 | 0.001 | 0 |
| | FBN | 0 | 0 | 0 | 0 | 0 | 0.0005 |
| Polymer | BPS | 0.1 | 0.1 | 0.1 | 0.1 | 0.1 | 0.1 |
| | APEG | 0.297 | 0.297 | 0.297 | 0.297 | 0.297 | 0.297 |
| Cross-linking agent | TAOE | 0.043 | 0.043 | 0.043 | 0.043 | 0.043 | 0.043 |
| Photo-initiator | DMPA | 0.01 | 0.01 | 0.01 | 0.01 | 0.01 | 0.01 |
| Lithium salt | LiTFSi | 0.113 | 0.113 | 0.113 | 0.113 | 0.113 | 0.113 |

[note 1]
The % by weight of PBN based on 100 percent by weight of polysiloxane (BPS) is Comparative Example 1 (CPE0, 0% by weight), Example 1 (CPE0.1, 0.1% by weight), Example 2 (CPE0.2, 0.2% by weight), Example 3 (CPE0.5, 0.5% by weight), Example 4 (CPE1, 1% by weight), respectively.

note 1) The % by weight of PBN based on 100 percent by weight of polysiloxane (BPS) is Comparative Example 1 (CPE0, 0% by weight), Example 1 (CPE0.1, 0.1% by weight), Example 2 (CPE0.2, 0.2% by weight), Example 3 (CPE0.5, 0.5% by weight), Example 4 (CPE1, 1% by weight), respectively.

Comparative Example 1

A solid electrolyte was prepared by the same method as in Example 1 while according to the composition described in Table 1 above, except that the boron nitride (PBN) surface-modified with PEG is not used.

Comparative Example 2

A solid electrolyte was prepared using BN surface-modified with PFPE (FBN) instead of BN surface-modified with PEG (PBN) which is the filler used in Example 1, while according to the composition described in Table 1.

(1) Surface Modification of Boron Nitride

A surface modification reaction of boron nitride (BN) was performed according to Scheme 3 below.

0.1 g of BN and 0.1 g of PFPE-pyrene obtained in Comparative Preparation Example 1 were dissolved in 100 ml of methoxynonafluorobutane, and sonification was performed for 20 hours.

Thereafter, the supernatant was collected three times while centrifuging at 10000 rpm for 15 minutes, and then dried at 50° C. to obtain boron nitride surface-modified with PFPE-pyrene (FBN).

At this time, the BN and PFPE-pyrene are combined by noncovalent functionalization, thereby modifying the surface of the BN (FBN).

(2) Preparation of Gel Polymer Electrolyte (G-CFBN)

A gel polymer electrolyte (G-CFBN) was prepared according to Scheme 4 below.

After dissolving FBN in acetone solvent and performing sonication for 3 hours, the mixture was mixed with PVDF-HFP (poly(vinylidene fluoride-hexafluoropropylene), PVH) to obtain a mixed solution. the amount of FBN was to be 0.5% by weight based on the total weight of the finally prepared solid electrolyte membrane.

The mixed solution was cast by a doctor blade to form a membrane (Composite Membrane, CFBN).

Thereafter, the mixed solution was immersed in a liquid electrolyte for 24 hours under argon condition to prepare a gel polymer electrolyte (Gel Polymer Electrolyte, G-CFBN). The liquid electrolyte comprises EC/DEC (v/v=1:1) and LiTFSI.

Comparative Example 3

After preparing a PVH (PVDF-HFP, poly(vinylidene fluoride-hexafluoropropylene)) membrane containing no filler, a gel polymer electrolyte (G-PVH) was prepared by impregnating it in an electrolyte solution (1M LiTFSI in EC:EDC (1:1 vol. %)).

Comparative Example 4

An electrolyte (LE-Celgard) was prepared by impregnating Celgard® 2325, a commercially available electrolyte membrane, in an electrolyte solution (1M LiTFSI in EC:EDC (1:1 vol. %)).

Experimental Example 1

An experiment was conducted to confirm the structure of the materials prepared in Examples and Comparative Examples.

FIG. 5 is a Thermo Gravimetric Analyzer (TGA) graph for BN surface-modified with PEG synthesized in Example 1.

Referring to FIG. 5, it can be seen that more than 4.3% by weight of PEG-pyrene is physically bonded to BN.

FIG. 6a shows FT-IR graphs of the solid electrolyte membranes prepared in Examples 1 to 4, FIG. 6b shows Raman Spectrum of the solid electrolyte membranes prepared in Examples 1 to 4, and FIG. 6c shows the FT-IR graph of the solid electrolyte membrane prepared in Comparative Example 1.

Referring to FIG. 6a, it can be seen through the disappearance of the peak corresponding to the thiol (—SH) group of polysiloxane (BPS) after UV crosslinking in Examples 1 to 4 that the reaction between the allyl group of allyl polyethylene glycol (APEG) and the thiol of BPS was proceeded, so that the side chain of polysiloxane was modified with PEG.

Also, referring to FIG. 6b, it can be seen that after UV crosslinking in Examples 1-4, the peak of C=C bond in allyl polyethylene glycol (APEG) is disappeared.

Also, referring to FIG. 6c, it can be seen that after UV crosslinking in Comparative Example 1, the peak corresponding to the thiol (—SH) group of the polysiloxane (BPS) is disappeared.

FIGS. 7a to 7c are a transmission electron microscope (TEM) photograph, Raman Spectrum, and TGA graph, respectively, for boron nitride (FBN) surface-modified with perfluoropolyether-pyrene (PFPE-pyrene), which is a filler used in the preparation of the gel polymer electrolyte of Comparative Example 2.

Referring to FIG. 7a, it can be seen that in the TEM image of FBN which is the filler used in the preparation of the gel polymer electrolyte (G-CFBN) of Comparative Example 2, signals of F and O are present.

Also, referring to FIG. 7b, it can be seen through Raman spectrum that a Raman band of PFPE-pyrene in the FBN are present.

Also, referring to FIG. 7c, it can be seen through the thermogravimetric (TGA) graph that the PFPE-pyrene is contained in an amount of 4.7% by weight based on the total weight of FBN, and thus the surface of the BN is modified.

FIG. 8 is a field emission scanning electron microscope (FE-SEM) photograph of the gel polymer electrolyte prepared in Comparative Example 2.

Referring to FIG. 8, it can be seen that pores are present in the membrane of the gel polymer electrolyte (G-CFBN) in Comparative Example 2.

Experimental Example 2

The ion conductivity of the solid electrolyte membrane prepared in Examples and Comparative Examples was calculated.

After measuring the resistance of the solid electrolyte membrane at 25° C., 10 mV, $10^1$ to $10^6$ Hz using a resistance meter (IM-6ex, ZAHNER-Elektrik GmbH), the ion conductivity (6) was calculated according to the following Equation (1).

$$\sigma=(1/R)\times(d/A) \quad [\text{Equation 1}]$$

wherein σ is the ion conductivity, R is the resistance of the solid electrolyte, d is the thickness of the solid electrolyte, and A is the area of the solid electrolyte.

FIGS. 9a and 9b shows graphs of the ion conductivity and graphs of the ion conductivity depending on the temperature, respectively, for the solid electrolytes prepared in Examples 1 to 4 and Comparative Example 1.

Referring to FIG. 9a, it was found that the solid electrolyte membrane of Comparative Example 1 (CPEO) without the filler PBN exhibits an ion conductivity of $2\times10^{-5}$ S/cm to $3\times10^{-5}$ S/cm (25° C.), whereas the solid electrolyte membranes of Examples 1 to 4 (CPE0.1 to CPE1) containing PBN exhibit greater ion conductivity than Comparative Example 1, and in particular, the ion conductivity of Example 3 (CPE0.5) with a PBN content of 0.5% by weight is the highest as $1.3\times10^{-4}$ S/cm.

Also, referring to FIG. 9b, it can be seen that the temperature and ion conductivity of the solid electrolyte is proportional.

In addition, Table 2 below compares the ion conductivity of Example 3 and Comparative Example 1. It can be seen that the ion conductivity of Comparative Example 1 at 60° C. is similar to the ion conductivity of Example 3 at 25° C.

TABLE 2

| | Content of filler (BPN) | Ion conductivity |
|---|---|---|
| Example 3 (CPE0.5) | 0.5% by weight | $1.3 \times 10^{-4}$ S/cm (25° C.) |
| Comparative Example 1 (CPE0) | 0% by weight | $4.0 \times 10^{-4}$ S/cm (60° C.) |

Experimental Example 3

An experiment was conducted on the thermal stability of solid electrolyte membranes prepared in Examples and Comparative Examples.

The pyrolysis temperature of the solid electrolyte membrane was measured using a thermogravimetric analyzer (TGA Q-5000IR, TA instrument).

FIG. 10 shows thermogravimetric (TGA) graphs for solid electrolytes prepared in Examples 1 to 4 and Comparative Example 1.

Referring to FIG. 10, it was found that the temperature ($T_{d,\ 5\ wt.\ \%}$) when the 5% by weight was reduced based on the initial weight of the solid electrolyte membrane is similar to 270° C. in all Examples 1 to 4 and Comparative Example 1 with different PBN contents. From these results, it can be seen that the solid electrolyte membrane shows higher thermal stability than the general liquid electrolyte.

Experimental Example 4

An experiment was conducted on the electrochemical stability of the solid electrolyte membrane of Example 3 (see FIG. 9a) which has the PBN content of 0.5% by weight and shows the highest ion conductivity among the examples.

An electrochemical stability was measured by linear sweep voltammetry (LSV) under conditions of 25° C., scan rate of 1 mVs$^{-1}$.

FIG. 11 shows the current-potential curve measured by linear sweep voltammetry for the solid electrolyte membrane of Example 3, which is the result of a total of two experiments.

Referring to FIG. 11, it is shown that the current starts to increase rapidly from about 4.5V of the operation voltage relative to the Li positive electrode, and from this, it can be seen that the solid electrolyte membrane is electrochemically stable within the operation voltage.

On the other hand, Comparative Example 1 is a solid electrolyte membrane containing no filler PBN.

Although the experiment on the electrochemical stability has not been conducted, in general, as the filler increases, the electrochemical stability of the membrane also increases, and thus, it is expected that a similar level of electrochemical stability will be obtained by using the same polysiloxane matrix as in Example 3.

Experimental Example 5

A performance test on the cell comprising gel polymer electrolytes (G-CFBN, G-PVH, LE-Celgard) prepared in Comparative Examples 2, 3, and 4, respectively was conducted.

Cell short circuit experiments and lifetime performance experiments were performed on cells (Li/G-CFBN/LFP, Li/G-PVH/LFP, Li/LE-Celgard/LFP) composed of lithium metal (Li) as a negative electrode, the gel polymer electrolyte (G-CFBN, G-PVH, LE-Celgard) as an electrolyte, and LiFePO$_4$ (LFP) as a positive electrode The output performance experiment was carried out for 1950 hours at a current density of 1 mA/cm$^2$.

In addition, the lifetime performance test was conducted for 500 cycles at 10 C.

FIGS. 12a and 12b are graphs showing the experimental results of the inhibition and life performance of lithium dendrites for cells comprising the gel polymer electrolytes (G-CFBN, G-PVH, LE-Celgard) of Comparative Examples 2, 3 and 4, respectively.

Referring to FIG. 12a, in the case of the cell including the gel polymer electrolyte (G-CFBN) of Comparative Example 2, it was confirmed that the cell did not short-circuit for 1950 hours.

In addition, referring to FIG. 12b, in the case of the cell containing the gel polymer electrolyte (G-CFBN) of Comparative Example 2, it was confirmed that 82% of the capacity was retained even after the 500-cycle test at 10 C.

It can be inferred that these results are due to the fact that the plate-shaped BN used as the filler in the G-CFBN inhibits the formation of lithium metal dendrites of the negative electrode.

The ionic conductivity and cation transport rate ($t_{Li+}$) of the gel polymer electrolyte (G-CFBN) prepared in Comparative Example 2 were measured.

The ion conductivity was measured in the same manner as in Experiment 2.

The cation transport rate was measured using a current change measurement for 20 h while applying a voltage of 10 mV to the Li/G-CFBN/LFP cell. The ion transport rate ($t_{Li+}$) was calculated as the ratio of the amount of current in the steady state ($I^S$) and the amount of current in the initial state ($I^O$) in accordance with the following Equation 2.

$$t_{Li} = I^S/I^O \quad \text{[Equation 2]}$$

FIG. 13 is a graph illustrating ion conductivity and cation transport rate measured for cells comprising gel polymer electrolytes (G-CFBN, G-PVH, LE-Celgard) of Comparative Examples 2, 3 and 4.

Referring to FIG. 13, after casting, a lot of pores are formed by acetone evaporation of the acetone-dominant part due to the difference in compatibility between boron nitride (FBM), PVDF-HFP and acetone. As a result, in the case of the gel electrolyte containing 0.5% by weight of FBN, a high liquid electrolyte uptake value of 210% was measured. Accordingly, high ionic conductivity of $8 \times 10^{-4}$ S/cm was achieved at room temperature.

In the above, although the present invention has been described by way of limited examples and drawings, the present invention is not limited thereto. Also, the present invention can be variously changed and modified by those skilled in the art within the equivalent scope of the technical spirit of the present invention and the claims to be described below.

The invention claimed is:
1. A solid electrolyte comprising:
 a polysiloxane; and
 boron nitride (BN),
  wherein the boron nitride is a boron nitride surface-modified with polycyclic aromatic hydrocarbon.
2. The solid electrolyte according to claim 1, wherein the solid electrolyte further comprises a lithium salt; and an organic solvent; wherein the polysiloxane is a polymer matrix and the boron nitride (BN) is a filler.

3. The solid electrolyte according to claim 1, wherein the boron nitride is contained in an amount of 0.1 to 5% by weight based on the weight of the polysiloxane.

4. The solid electrolyte according claim 1, wherein the polycyclic aromatic hydrocarbon is at least one selected from the group consisting of pyrene, perylene and benzoperylene.

5. The solid electrolyte according to claim 1, wherein the polycyclic aromatic hydrocarbon is one whose end is modified by a combination of polyethylene glycol (PEG).

6. The solid electrolyte according claim 1, wherein the polycyclic aromatic hydrocarbon is contained in an amount of 4 to 10% by weight based on the total weight of the surface-modified boron nitride.

7. The solid electrolyte according to claim 1, wherein the molecular weight of the polysiloxane is 800 to 1200 g/mol.

8. The solid electrolyte according to claim 2, wherein the lithium salt is at least one selected from the group consisting of $LiN(SO_2CF_3)_2$(LiTFSI), LiSCN, $LiN(CN)_2$, $LiClO_4$, $LiBF_4$, $LiAsF_6$, $LiPF_6$, $LiCF_3SO_3$, $Li(CF_3SO_2)_3C$, $LiN(SO_2CF_3)_2$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, and $LiB(C_2O_4)_2$.

9. The solid electrolyte according to claim 2, wherein the organic solvent is at least one selected from the group consisting of methanol, acetone, 4-acetylmorpholine, 2-methylpyridine-1-oxide, 2-pyrrolidon, 1-(2-hydroxyethyl)-2-pyrrolidinone, propylene carbonate (PC), ethylene carbonate (EC), 2-oxepanone, butanone, 2-pentanone, methyl ethyl ketone (MEK) and methoxynonafluorobutane.

10. The solid electrolyte according to claim 2, wherein the solid electrolyte further comprises a crosslinking agent comprising tetraallyl oxy ethane (TAOE).

11. A method for preparing a solid electrolyte comprising the steps of:
(S1) reacting a boron nitride with a polycyclic aromatic hydrocarbon to form a surface-modified boron nitride;
(S2) dissolving a polysiloxane, a crosslinking agent and a photo-initiator in an organic solvent to form a mixed solution;
(S3) adding the surface-modified boron nitride and a lithium salt to the mixed solution to form a slurry; and
(S4) casting the slurry onto a substrate and then curing the slurry.

12. The method for preparing the solid electrolyte according to claim 11, wherein the initiator is at least one photo-initiator selected from the group consisting of 2,2-dimethoxy-2-phenylacetophenone, 1-hydroxy-cyclohexyl phenyl ketone and 2,4,6-trimethylbenzoyldiphenyl-phosphineoxide.

13. A lithium secondary battery comprising the solid electrolyte of claim 1.

14. The solid electrolyte according to claim 1, wherein the polysiloxane is contained in an amount of 15 to 20% by weight based on the weight of the solid electrolyte.

15. The solid electrolyte according to claim 1, wherein the solid electrolyte further comprises at least a polymer selected from the group consisting of allyl polyethylene glycol (APEG), polyethylene glycol (PEG), ethylene glycol (EG) and polyethylene glycol diacrylate (PEGDA).

16. The solid electrolyte according to claim 1, wherein the boron nitride is contained in an amount of 0.1 to 3% by weight based on the weight of the polysiloxane.

17. The solid electrolyte according to claim 1, wherein the boron nitride is contained in an amount of 0.1 to 1% by weight based on the weight of the polysiloxane.

18. The solid electrolyte according to claim 10, wherein the crosslinking agent is contained in an amount of 5 to 10% by weight based on the weight of the solid electrolyte.

* * * * *